United States Patent [19]
Wilkerson

[11] Patent Number: 5,283,726
[45] Date of Patent: Feb. 1, 1994

[54] AC LINE CURRENT CONTROLLER UTILIZING LINE CONNECTED INDUCTANCE AND DC VOLTAGE COMPONENT

[76] Inventor: Alan W. Wilkerson, W61 N14280 Taunton Ave., P.O. Box 191, Cedarburg, Wis. 53012

[21] Appl. No.: 810,961

[22] Filed: Dec. 20, 1991

[51] Int. Cl.$^5$ ............................................. H02M 1/12
[52] U.S. Cl. ........................................ 363/41; 363/98; 363/132; 323/207
[58] Field of Search ............... 323/207; 363/89, 41, 363/98, 132

[56] References Cited

U.S. PATENT DOCUMENTS

| | | | |
|---|---|---|---|
| 4,472,672 | 9/1984 | Pacholok | 323/207 |
| 4,625,272 | 11/1986 | Okuyama et al. | 323/207 |
| 4,677,366 | 6/1987 | Wilkinson et al. | 323/222 |
| 4,683,529 | 7/1987 | Bucher | 363/89 |
| 4,729,082 | 3/1988 | Sato | 363/41 |
| 4,730,242 | 3/1988 | Divan | 363/132 |
| 4,816,982 | 3/1989 | Severinsky | 363/44 |
| 4,891,744 | 1/1990 | Yamamoto et al. | 363/89 |
| 5,001,620 | 3/1991 | Smith | 363/89 |
| 5,003,454 | 3/1991 | Bruning | 363/89 |
| 5,045,991 | 9/1991 | Dhyanehand et al. | 323/207 |
| 5,047,912 | 9/1991 | Pelly | 363/89 |
| 5,051,684 | 9/1991 | Angquist | 323/207 |
| 5,063,338 | 11/1991 | Capel et al. | 363/98 |
| 5,119,283 | 6/1992 | Steigerwald et al. | 323/207 |
| 5,132,888 | 7/1992 | Lo et al. | 363/132 |
| 5,146,398 | 9/1992 | Vila-Masot et al. | 363/89 |

OTHER PUBLICATIONS

"Switching-supply power factor is more than a nuisance", *Electronic Products*, Mar. 1990.
"Power Factor Correction—Incentives, Standards and Techniques", *PCIM*, Jun. 1990.
"Power Factor Correction for Single-Phase Input Power Supplies", *PCIM*, Dec. 1989.
"Specialized ICs correct power factor in switching supplies", *EDN*, Jul. 4, 1991.
"ML4812 Power Factor Controller", Micro Linear, Jul. 24, 1989.
"APT Power MOS IV TM Applications—Power Factor Correction" Dec. 19, 1991.

*Primary Examiner*—J. L. Sterrett
*Attorney, Agent, or Firm*—Andrus, Sceales, Starke & Sawall

[57] ABSTRACT

A controller for controlling currents in an AC line connected to the controller is capable of causing the controlled current to assume any pre-determined magnitude and wave form. The pre-determined AC magnitude and wave form need not be of the same frequency or wave form existing at AC power lines connected to the controller. The controller uses the voltage at the AC power lines and an additional DC voltage as two sources of power to control the current in an inductor connected in series with the AC lines. A plurality of electronic switches are arranged so that at any instant in time, closing of appropriate switches will apply either the line voltage, or the sum of the line voltage and the DC voltage, or the difference between the line voltage and the DC voltage to the inductor. This causes the current of the inductor to increase or decrease at a rate determined by the net applied voltage. Because of the two sources of power, either a positive or negative voltage is available at any time for connection to the inductor. Modulation of the switches provides a time varying average voltage across the inductor that results in the desired time varying inductor current which, due to its series connection is also the AC line current. Applications of the controller include control of power factor, at unity or any desired lagging or leading level, neutralizing of harmonic line currents, and recovery of power generating externally of the controller by feeding regenerative current back to the AC power lines.

50 Claims, 19 Drawing Sheets

QUADRANT I

QUADRANT II

QUADRANT III

QUADRANT IV

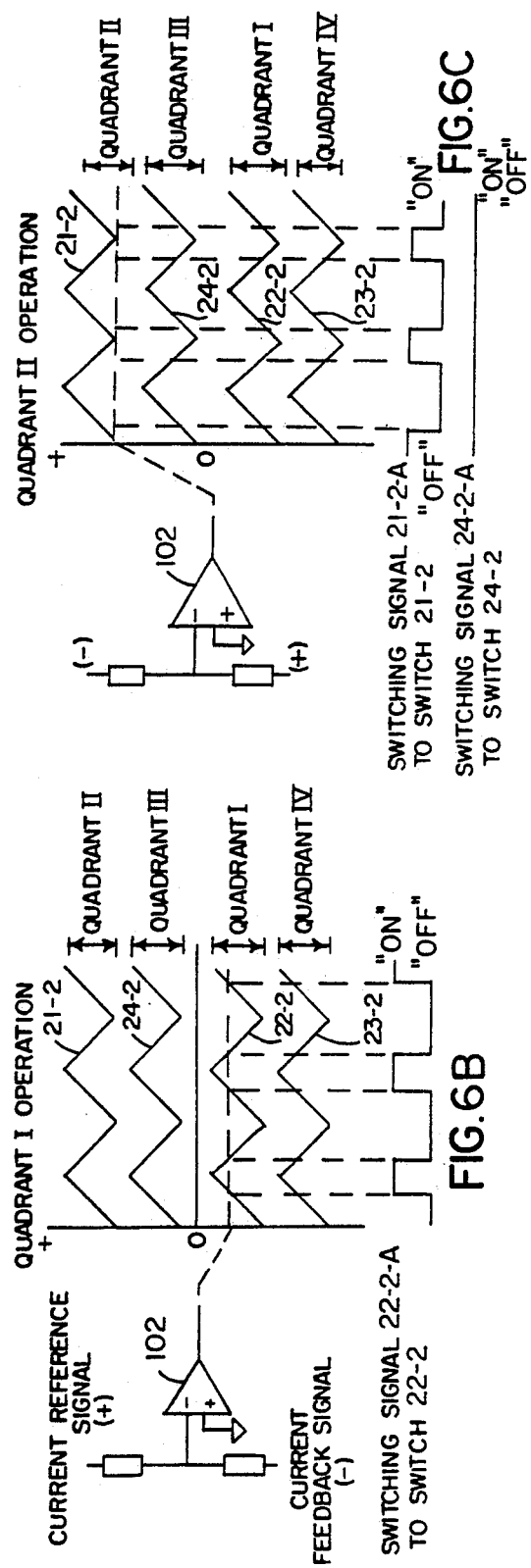
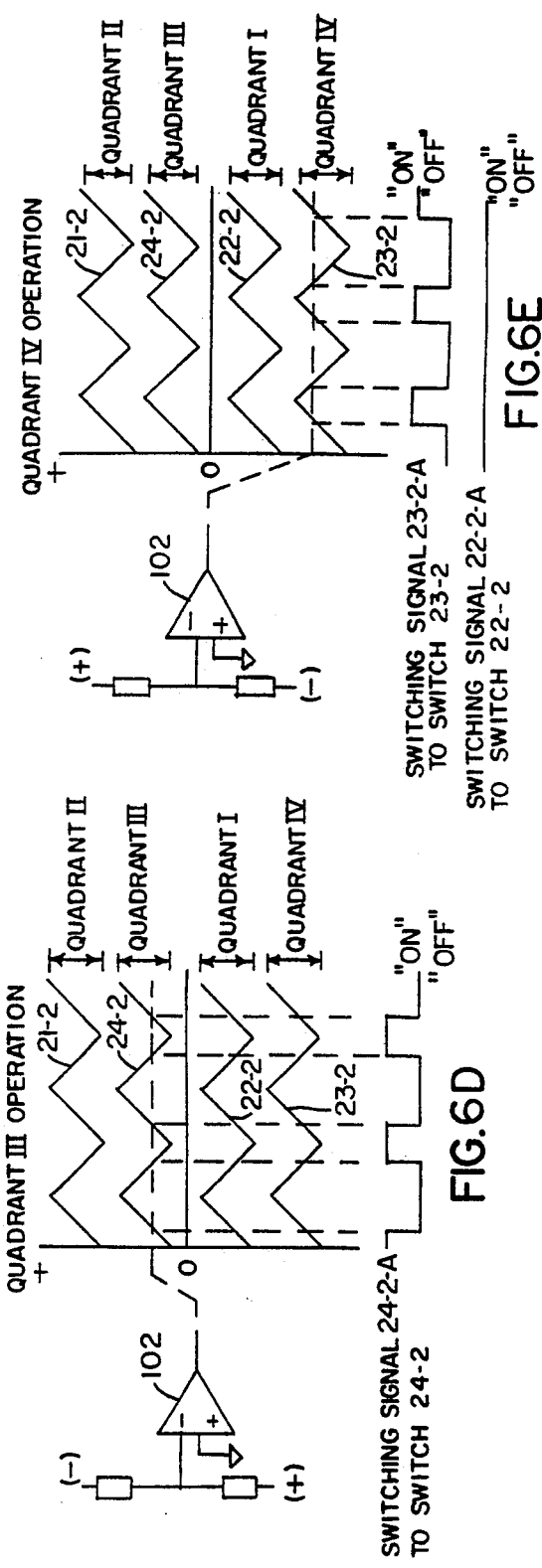

AC LINE CURRENT CONTROLLER UTILIZING LINE CONNECTED INDUCTANCE AND DC VOLTAGE COMPONENT

BACKGROUND OF THE INVENTION

The present invention relates to an electrical controller. The controller is typically connected to AC power lines or mains. The controllable current properties provided by the controller may be used to overcome electrical distortion in the power mains produced by an electrical element, such as an electrical load, connected to the controller or to the mains. The quality of the power in the AC mains is thereby maintained and the electrical efficiency in operating the load maximized. The controller has bidirectional power flow properties that permit it to function when the electrical element connected to the controller is either a load or an electrical power source.

Power quality is best and electrical operating efficiency greatest when the alternating current in the AC power mains, termed herein the "AC line current," is sinusoidal in waveform and in phase with the AC voltage in the mains, termed herein "line voltage." However, as noted in detail below, certain types of electrical elements, such as alternating current induction motors, shift the AC line current in the power mains out of phase with the AC line voltage. Other types of elements, such as AC to DC rectifier power supplies with a smoothing capacitor alter the sinusoidal waveform of the AC line current. While as a result of such alterations in the AC current, AC power quality and electrical efficiency has heretofore suffered, the controller of the present invention can establish the AC line current at an in phase, sinusoidal state, thereby obviating the foregoing shortcomings.

The above noted phase shift between AC current and line voltage is commonly described as low power factor. The term "power factor" is defined as the ratio of real power (measured in watts) to the apparent power (measured in volt-amperes). One cause of low power factor is an AC line current that lags the AC line voltage. A load which typically results in low power factor is an induction motor. When an induction motor is connected to AC power mains, the line current drawn by the motor is sinusoidal as is the line voltage, but the line current lags the line voltage.

In the prior art, the low power factor that characterizes an induction motor load has been corrected by placing a capacitor in parallel with the motor winding. The capacitor adds leading current to the lagging line current created by the motor's inductance, resulting in a near-zero phase displacement between the AC line current and line voltage.

A problem with this prior art approach, however, is that the capacitance of the capacitor is usually fixed whereas the electrical properties of the load may vary during operation. Thus, this approach does not satisfactorily correct the low power factor problem under all conditions.

Another problem with other types of loads is that, unlike induction motors, they draw non-sinusoidal current from the AC power mains. Fourier analysis can be used to resolve the non-sinusoidal current into a fundamental sinusoidal wave at line frequency and a number of multiples of line frequency known as harmonics. The fundamental waveform produces power in the load. However, the harmonic waveforms produce no net power in the load, and in fact result in heating losses, low power factor, and an inefficient use of the power distribution system. The harmonics add to the current demand on the AC power mains and typically result in a need for higher capacity wiring.

One example of an application which results in high harmonic content in the AC line current is a motor control using one or more silicon-controlled rectifiers (SCRs). SCR motor controls produce high levels of harmonics because the SCR switching is abrupt and results in discontinuous waveforms.

One prior art way of overcoming the problems arising from the presence of harmonics is the use of filters called harmonic wave traps. Such a wave trap is connected across the power mains supplying an SCR motor control that generates significant harmonic content. The wave trap typically includes filters for eliminating the 5th, 7th, 9th and 11th harmonics. However, the use of wave traps adds to the cost and complexity of the SCR equipment and is not always completely successful in eliminating harmonics.

An AC to DC rectifier power supply which has a smoothing capacitor is an example of another device which generates a high harmonic content in the AC line current. The AC power mains are connected to one side of a full wave rectifier bridge and the smoothing capacitor is connected across the DC side of the bridge. The capacitor voltage is applied to one or more voltage regulators that alter the capacitor voltage to the DC operating voltages needed for the equipment to be powered by the power supply. The regulators are typically of the switching type.

In a power supply of this type, the rectifier bridge connected to the AC power mains charges the capacitor with pulses of current that occur only at the peak of each half cycle of the AC line voltage. The AC line current is thus discontinuous and non-sinusoidal, resulting in harmonics, particularly at the points of discontinuity.

Since the current pulse is relatively narrow and must provide electrical power for the entire half cycle, the root-mean-square (RMS) value of the current pulse is much higher than would be the RMS value of sinusoidally-shaped current producing an equivalent amount of electrical power but extending continuously over the entire half cycle. This results in a reduction in the current and real power that may be obtained from the power supply for AC power mains of a given rating. For example, for AC power mains rated at 15 amps RMS, only approximately 8.5 amps of real power may be obtained from this type of power supply without exceeding the current rating of the mains. The pulse-like nature of the current also results in the reduction in the power factor of the power supply over that which would be obtained with a sinusoidal-shaped, continuous current.

The sharp current pulses additionally alter the voltage waveform in the AC power mains by reducing the voltage peaks due to the voltage drop caused by line impedance. This distortion of the AC line voltage may adversely effect other equipment connected to the line.

A further problem arising from the use of such power supplies is that of excessive loading of the neutral conductor when the AC power mains for the power supply comprises a three phase service. Under normal three phase service conditions, and when the currents are generally sinusoidal and electrical loads are balanced, there is little or no current flowing in the neutral conductor. This is due to the fact that current flowing in one phase is matched by an oppositely flowing current in one or both of the other phases.

However, due to the pulse-like nature of the current generated in this type of power supply, there may be no oppositely flowing current pulses in either of the other phases when current is flowing in one phase of a three phase service. The current must then flow through the neutral conductor. This problem becomes acute because this situation exists with respect to each of the three phases. Thus, the neutral conductor may be subjected to three times the thermal loading of any of the individual three phase lines. The high thermal loading may cause the neutral conductor to burn out creating a potential for fire. This is a serious concern in a situation in which, for example, an office building has a large number of computers having such power supplies installed.

As a result of the above-described problems, agencies which set standards for electrical power quality are beginning to establish requirements with respect to the amount of harmonic currents, and voltage waveform distortion, that will be permitted to be generated by the power supplies of electrical equipment.

In an attempt to reduce the AC line harmonics and to increase power factor, several types of power factor correction circuits have been developed. These power factor correction circuits are coupled in the DC portion of the power supply between the rectifier bridge and the output capacitor. The purpose of these circuits is to force the output current of the rectifier bridge to have a wave form which is shaped like a fully rectified sinusoid. The current reflected from the DC side, through the rectifier, to the AC side becomes essentially a sinusoidal AC current, thereby to reduce harmonics and increase power factor.

These prior art power factor correction circuits are generally of three types: buck, boost, and flyback (buck-boost). Each of these types of power correction circuits includes a current control element such as a power transistor. The current control element is operated in a pulse width modulated manner. The incremental direct current of the control element is established at a level that obtains the desired current during each switching increment. Capacitive, inductive, and diode elements smooth the current obtained during pulse width modulation to obtain a continuous, sinusoidal current.

These prior art power factor correction circuits have a number of limitations. One of these limitations is the nature of the current. For example, in a buck-type circuit, the input current is discontinuous, although the output current is continuous. The flyback-type circuit also has the discontinuous current at its input. These current discontinuities in the buck and flyback-type circuits often require use of an input filter that adds to the cost of the power supply.

Another problem with these prior art power factor correction circuits lies with the inductor in the circuit. Since this inductor is located at the DC output of the rectifier bridge, it is subjected to only unidirectional current. The inductor must therefore be sized to insure that it does not saturate under the anticipated operating conditions of the power supply. The result is that the inductor must often comprise a large and expensive component of the power supply.

A further shortcoming of the foregoing type of prior art power supplies is that they do not permit the bidirectional transfer of power between the AC power mains and the electrical element connected to the power supply. They thus cannot be used to supply electrical elements, such as motor drives where the motor must regenerate, or supply power back to the AC power mains.

SUMMARY OF THE INVENTION

It is therefore the object of the present invention to provide a means, termed herein "a controller," having an AC portion connected to AC power which the current can be controlled with respect to magnitude, waveshape, and flow direction. The current can be controlled so that current distortion in the AC power mains can be avoided. For example, the controller of the present invention can be operated to generate a sinusoidal current which is leading with respect to the line voltage, thereby to provide power factor correction to the AC mains when an induction motor is connected to the mains.

Or, in cases where the load connected to the AC power mains generates harmonic components, the controller of the present invention may be operated to compensate for the harmonics so generated, so that only sinusoidal AC current appears in the AC power mains.

When the load is connected to the controller, rather than the AC power mains, the controller may be operated so that the current in the AC portion of the controller is sinusoidal and in phase with the line voltage regardless of current conditions existing in the load.

Briefly, in the electrical controller of the present invention, an inductor is placed in the AC portion of the controller connected to the AC power mains containing the AC line voltage. A direct current element, such as a capacitor, is placed in the DC portion of the controller. The DC element must be capable of attaining a voltage greater than the magnitude of the AC line voltage and of maintaining that voltage as current is withdrawn or supplied to the capacitor in the operation of the controller.

A current path switch configuration is interposed intermediate the AC and DC portions of the controller. The switch configuration is operated so that a voltage of either polarity can be made to appear across the inductor. By controlling the magnitude and polarity of the voltage across the inductor and the duration of its application, the magnitude and flow direction of the current through the inductor, and hence the current in the AC portions of the circuitry, may be established. The switch may be operated in a pulse width modulated manner.

When the current in the AC portions of the controller is controlled so as to be sinusoidal in wave form, the application of harmonics to the AC power mains when operating a load connected to the AC power means and/or the controller itself is avoided. The control of the sinusoidal current may be such that the current is in phase with the AC line voltage so that operation of the controller is at unity power factor. Or, the current may be phase shifted with respect to the AC line voltage, so as to enable the controller to correct for power factor distortion caused by other elements connected to the AC power mains.

In cases in which the operation of one or more elements connected to the AC mains generates harmonics, the current in the AC portion of the controller of the present invention can be controlled so as to compensate for such harmonics, so that only sinusoidal, in phase AC line current is present in the AC power mains.

The switch configuration of the controller of the present invention may be so constructed as to function under all combinations or "quadrants" of applied AC voltage and flow direction to which the AC portions of the controller may be subjected, thereby permitting bi-directional power flow. That is, power can flow from the AC power mains to a load connected to the DC portions of the controller or power can flow or regenerate, from an electrical power source connected to the DC portions of the controller to the AC power mains. The controller of the present invention may be used in conjunction with a motor control to provide for the regeneration of power from a motor to AC power mains at unity power factor.

These and other features and advantages of the present invention will be apparent to those skilled in the art from the detailed description of the preferred embodiments and the attached drawings, in which:

BRIEF DESCRIPTION OF THE DRAWINGS

FIGS. 6B through 6E show operation of the controller of the present invention in the various quadrants.

DETAILED DESCRIPTION OF THE PREFERRED EMBODIMENTS

Figure 1:
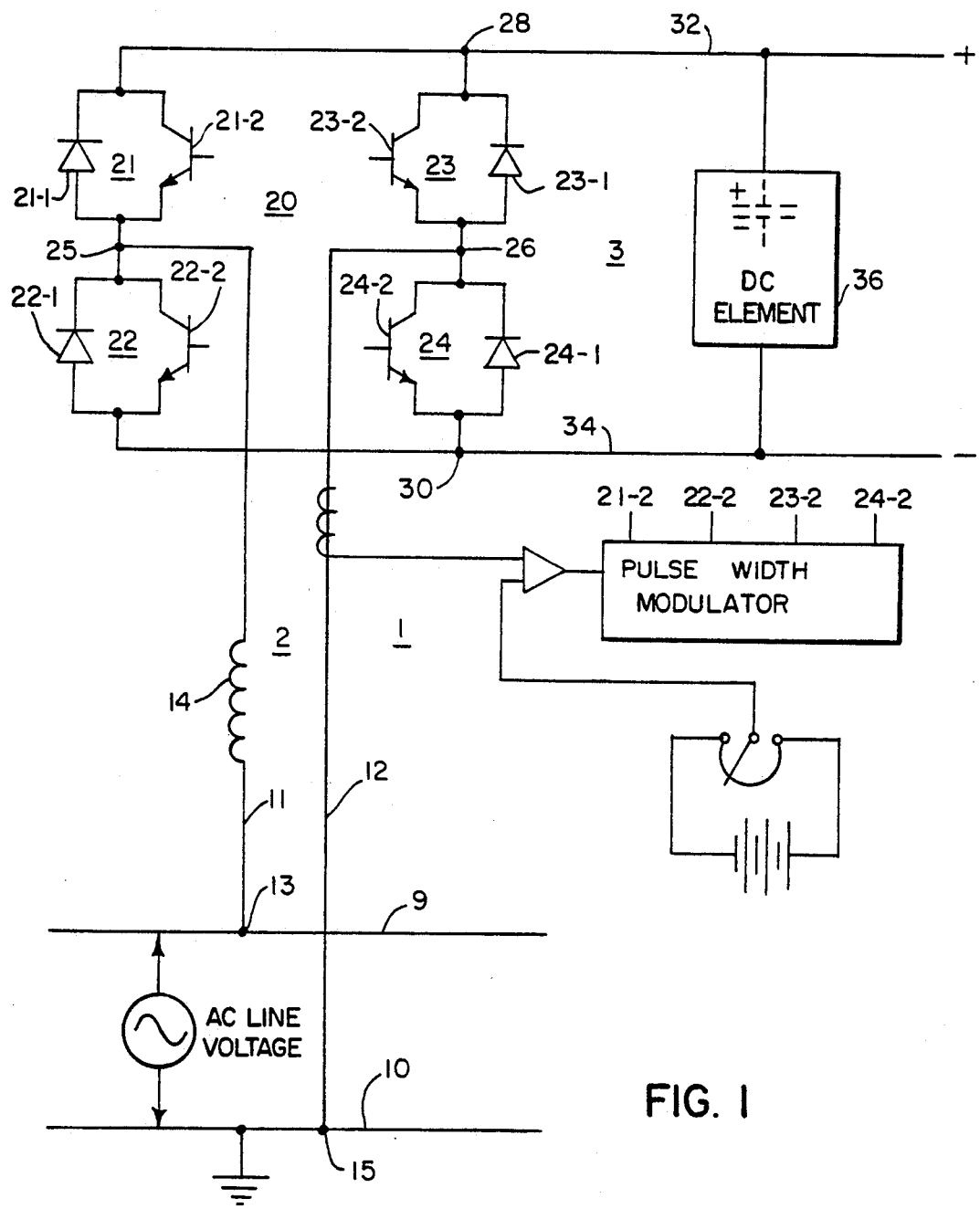
FIG. 1 is a schematic diagram of a basic embodiment of the controller according to the present invention.

FIG. 1 shows a basic embodiment of a controller 1 of the present invention in a single phase configuration. In the form shown in FIG. 1, controller 1 comprises an AC portion 2 separated from a DC portion 3 by a plurality of current conduction paths 21, 22, 23, and 24, connected in configuration 20.

Controller 1 is connected to the AC voltage existing in conventional AC power mains 9 and 10 by conductors 11 and 12 and terminals 13 and 15. As is typical of a single phase AC service, one of the power mains, main 10, may be a neutral conductor with respect to the AC power in the other power main, main 9.

An inductor 14 is interposed in conductor 11 and is thus in the AC portion of the controller. Inductor 14 is typically a coil of wire wound on a core of iron or other ferromagnetic material. In an inductor, the rate of change of the current i flowing through the inductor is proportional to the voltage E existing across the inductor and inversely proportional to the inductance L of the inductor, as determined by the number and configuration of the turns of the wire coil, the magnetic properties of the core, and other factors. This integral relationship is expressed mathematically as $$i = \frac{1}{L} \int_a^b E \, dt + Ia \qquad \text{(Eq 1)}$$

where Ia is the current existing at the beginning of the occurrence of the voltage E at time Ta. From an inspection of Equation 1, it will be seen that by controlling either or both of the voltage across an inductor and the time period during which the voltage is applied, the current through the inductor can be established at any desired magnitude. Further, by controlling the polarity of the voltage across the inductor, the direction in which the magnitude of the current is changed during the time period can be determined so as to make the current increase, decrease, or reverse flow direction.

Since the current in inductor 14 can be controlled in the foregoing manner, the current in the AC portion of converter 1 can also be controlled, since the two currents are one and the same.

Inductor 14 allows the current in controller 1 to change in a controlled manner responsive to the voltage across the inductor and enables a smooth transition from one current level to another current level in the operation of controller 1. Further, the energy stored in the inductor may be used to establish a voltage across the inductor when required by the operation of the controller.

By placing inductor 14 in the AC portion of the circuit, the inductor is typically subjected to the bidirectional current found in this portion of the circuitry and in the AC power mains. It may thus be smaller than an inductor placed in the DC portion of the controller while at the same time avoiding the possibility of the inductor becoming saturated by the unidirectional DC current.

The AC portions of controller 1, and specifically conductors 11 and 12, are connected to the plurality of current conduction elements 21, 22, 23, and 24 connected in configuration 20 by AC terminals 25 and 26. Each AC terminal 25 and 26 of configuration 20 is connected to each of the two DC terminals 28 and 30 by one of the current conduction elements 21, 22, 23, or 24, so that the current conduction elements form four possible current paths between the AC and DC terminals.

Each of the current conduction elements 21 through 24 comprises a diode and a controllable current conduction device, termed herein a "switch", connected in parallel. The controllable current conduction device has unidirectional current flow characteristics and is poled to conduct current in a direction opposite to the direction of current flow in the associated diode. Thus, current conduction element 21 extending between AC terminal 25 and DC terminal 28 comprises diode 21-1 and oppositely poled controllable current conduction device or switch 21-2, exemplarly shown in FIG. 1 as a power transistor. The transistor or switch 21-2 has a control terminal by which the transistor may be rendered conductive or non-conductive. When the transistor is rendered conductive, switch 21-2 may be described as turned "on" or "closed". When the transistor is rendered non-conductive, switch 21-2 may be described as turned "off" or "open".

For current conduction element 21, conventional current will flow through the diode 21-1 in the direction from anode to cathode, whenever the voltage at AC terminal 25 is positive with respect to DC terminal 28. When DC terminal 28 is positive with respect to AC terminal 25, no current will flow through diode 21-1, but current may flow through switch 21-2 if switch 21-2 is "on". If switch 21-2 is "off" no current will flow in either portion of current conduction element 21.

The remaining current conduction elements of configuration 20 are similar in construction and function and are correspondingly identified in the specification and drawings.

DC terminals 28 and 30 are connected to DC buses 32 and 34, respectively. A DC element 36 is connected across DC buses 32 and 34. For purposes of explanation, DC element 36 is shown as a capacitor in FIG. 1. The capacitor or other DC element has the following characteristics. First, it functions with an operating voltage that is always greater in magnitude than the instantaneous magnitude of the AC voltage in conductors 11 and 12. The operating voltage of DC element 36 be maintained by the action of controller 1, or it may be independently maintained by a source of power external to controller 1.

Second, the DC element 36 must be capable of accepting or supplying whatever currents are involved in the operation of the controller, without excessive voltage changes. For purposes of explanation herein, it will be assumed that the magnitude of DC voltage of element 36 is a fixed voltage greater than the amplitude of the instantaneous peak voltage of the AC line voltage in conductors 11 and 12.

The size of capacitor 36 is selected in accordance with the switching criteria or safety requirements of controller 1 or to match the electrical requirements of an electrical element connected to the controller. For a controller operating from 120 volt AC power mains, in which capacitor 36 has an operating voltage 200 volts, and which has a 1 kilowatt motor drive connected to the controller, the capacitance of capacitor 36 may be 500-1000 microfarads. For applications involving 350 volt, 200 watt computer power supplies, capacitor 36 may be about 100 microfarads.

The operation of the switches 21 through 24 in configuration 20 is such as to cause one or both of the voltage sources, i.e. AC power mains 9, 10 or capacitor 36, to establish the voltage across inductor 14 or to allow the energy stored in inductor 14 to establish this voltage. By operation of the switches in controller 1 in a desired manner, it is possible to establish an AC current in the AC portion of the controller having any desired direction of flow, wave shape, and magnitude, thereby to carry out the objects of the invention noted above.

As far as the AC line is concerned, four distinct possible operative conditions, related to the instantaneous direction or polarity of the AC line voltage, and the instantaneous direction of the AC line current are possible for controller 1. Since the AC line periodically reverses its polarity each half cycle, both polarities of line voltage will be present from time to time. For each polarity of the AC line voltage, it is possible for the current to exist in either direction, thus resulting in the four operative conditions. These four operative conditions are hereinafter termed "quadrants" and are defined as follows and as shown in FIGS. 2A through 2D.

Quadrant I is defined as the operative condition where the instantaneous AC voltage at conductor 11 is positive with respect to conductor 12, and the instantaneous current IAC flows through inductor 14 in a direction from terminal 13 to terminal 25. See FIG. 2A. Since the current is flowing out of the positive terminal of the AC power mains, this quadrant represents a condition where the AC power mains is a source of power.

Quadrant II is defined as the operative condition where the instantaneous voltage on conductor 11 is also positive with respect to the voltage on conductor 12, but the instantaneous current IAC flows in the opposite direction, namely from terminal 25, through inductor 14, to terminal 13. See FIG. 2B. Since this current flows into the positive terminal of the AC power main, this quadrant represents a condition where the AC power mains are receiving or absorbing power, and are thus a "load". In this instance, the source of power is the DC element.

Quadrant III is defined as the operative condition where the instantaneous AC line voltage at conductor 11 is negative with respect to the voltage at conductor 12, and the instantaneous current IAC flows through inductor 14 in a direction from terminal 25 to terminal 13. See FIG. 2C. Since the current is flowing into the negative terminal of the AC power mains, this quadrant, as in quadrant I, also represents a condition in which the AC power mains are a source of power.

Quadrant IV is defined as the operative condition where the instantaneous AC line voltage at conductor 11 is also negative with respect to the voltage at conductor 12, but the instantaneous current flows through inductor 14 in a direction from terminal 13 to terminal 25. See FIG. 2D. Since the current is flowing out of the negative terminal of the AC power mains, this quadrant, as in quadrant II also represents a condition where the AC power mains are a "load", and absorb or receive power. Again, the source of power is the DC element.

Inductor 14 is at all times in series with AC line conductors 11 and 12, and its current is therefore at all times equal and identical to the AC line current of controller 1. As noted above, the operation of controller 1 takes advantage of the characteristics of inductor 14, using switches 21-2, 22-2, 23-2, and 24-2 of configuration 20 to apply the voltage of the AC line and the voltage of the DC element across the inductor to control the current through the inductor. When operation of the switches in current conduction elements 21 through 24 has successfully established a desired magnitude and direction of current in the inductor, it has also established that value of current in AC line conductors 11 and 12.

As will be shown, for each quadrant of operation there is at least one combination of open and closed switches in configuration 20 that will apply a voltage across the inductor which will cause the current in the inductor to increase, and at least one other combination of open and closed switches that will apply an opposite polarity voltage across the inductor which will cause the inductor current to decrease. By alternating between these two combinations at a relatively high frequency, with respect to the AC line frequency, and varying the duty cycle, i.e. the proportionate times of the current increasing condition and the current decreasing condition, it is possible to increase, decrease, or maintain a constant average magnitude of current in the specific quadrant of operation.

The alternate switching between a current increasing condition and a current decreasing condition may operate at a constant frequency, where the total time of two successive conditions is a constant value, corresponding to the switching period, and thus inversely proportional to the switching frequency. The proportion of time allocated to the current increasing condition is varied with respect to the total time.

This operation is known as "pulse width modulation", since the "width" or time of the current increasing condition is changed or "modulated" to effect the increase, decrease, or maintenance of current in inductor 14.

Variations in the relative proportion of the current increasing and decreasing conditions can also be accomplished by switching the current increasing condition to an active state for periods of time which are equal, but varying the frequency of the active periods. This is known as pulse frequency modulation. Although both methods are effective, for purposes of describing the operation of the four quadrants, pulse width modulation will be used.

If the switching frequency is substantially higher than the AC line frequency, any specific instantaneous voltage level of the AC line voltage waveform can be considered essentially constant for of understanding the explanation of operation of controller 1, since the AC voltage will not change significantly during a switching cycle of the pulse width modulation, and the voltage of the DC element has been assumed constant. For example, if the frequency of the AC voltage in the AC power mains is 50/60 Hz, switches 21-2, 22-2, 23-2, and 24-2 may be pulse width modulated at a frequency of 15 Khz. For 60 Hz AC voltage, this would provide 250 modulation intervals per cycle.

A high frequency of pulse width modulation will provide more accurate control of current but the switch components may be difficult and expensive to obtain. High operating frequencies and power increases the radio frequency and electromagnetic interference generated by controller 1. The use of lower frequencies may avoid the foregoing problems but may generate audible noise in the form of a high pitched squeal. The above mentioned 15 kiloHertz modulating frequency has been found to be a workable compromise.

For any fixed polarity of line voltage which corresponds to a specific half cycle, two quadrants of operation will determine the direction of current flow, with two corresponding combinations of current increasing and current decreasing switches.

Similarly, in the other half cycle of the AC line voltage cycle, different combinations of switches are used to control the magnitude and direction of the current, thus adding control for the controller in the other two quadrants.

The operation of controller 1 to establish a current having the desired properties, through control of switches 21-2, 22-2, 23-2 and 24-2 of configuration 20 in a pulse width modulated manner is as follows and as shown in FIGS. 3A through 3D. The outputs of a pulse width modulator 38 is connected to the control terminals of the switches, as shown by the corresponding reference numerals. Pulse width modulator 38 is shown in FIGS. 1 and 3 as having a simplified regulator including reference source 40 and current feedback means 42. As noted above, the magnitude of the AC current at any given time is determined by the duty cycle characteristics of the pulse width modulation. The direction of current flow is determined by selection of the appropriate switch or switches in configuration 20.

In the example shown in FIGS. 3A-3D, and to demonstrate the principle of operation of controller 1, it is desired to establish a current of constant magnitude in AC conductors 11 and 12 in a half cycle of the AC voltage in which the voltage at AC terminal 13 is positive with respect to the voltage at AC terminal 15. It is further desired that the current flow through inductor 14 proceed from AC terminal 13 to terminal 25 of configuration 20. The AC current will flow out of controller 1 at AC terminal 15. It will be recognized that these conditions represent operation of controller 1 in quadrant I.

Figure 3A:
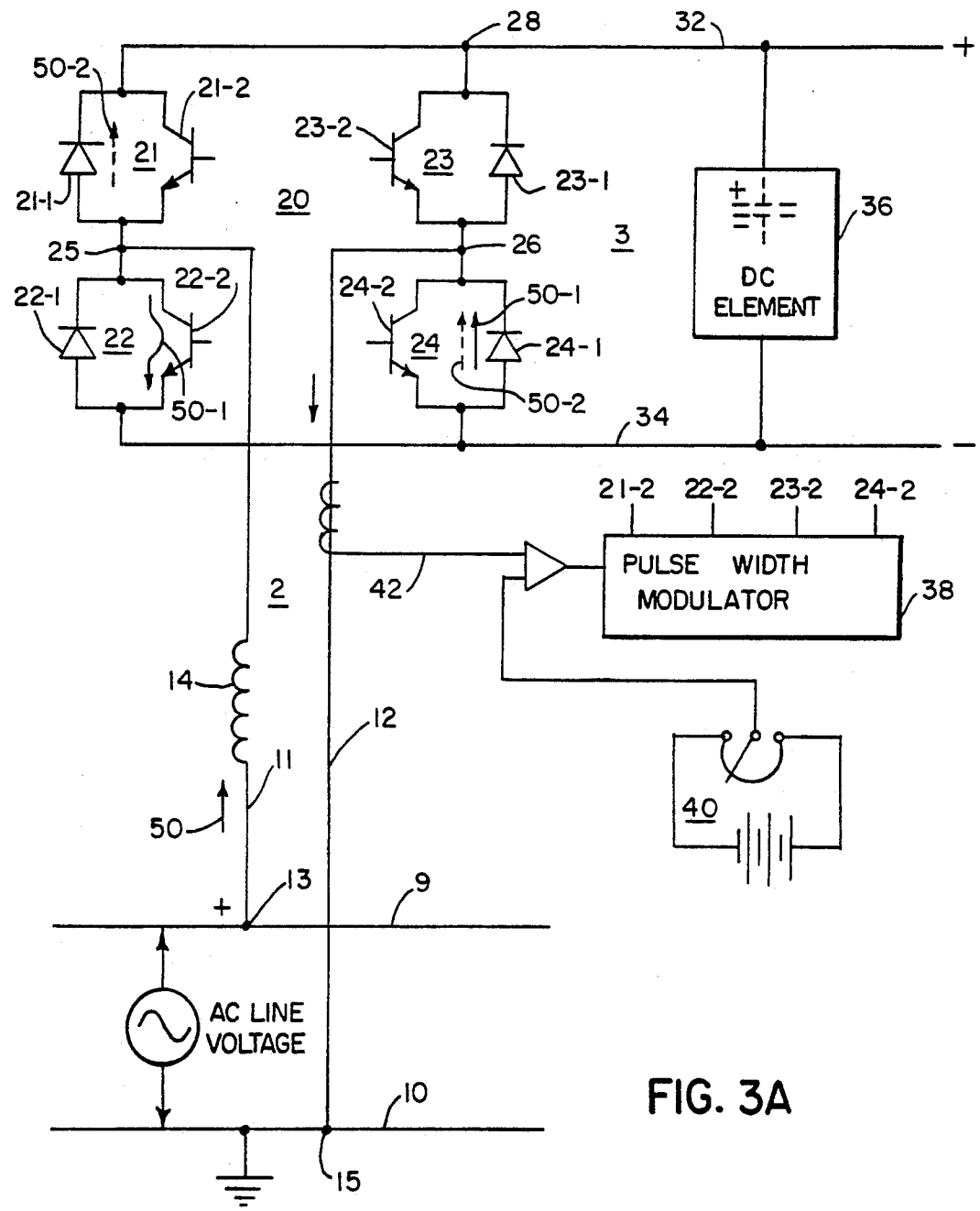
FIG. 3A is a schematic diagram of the controller showing operation of the controller in quadrant I.
Figure 3B:
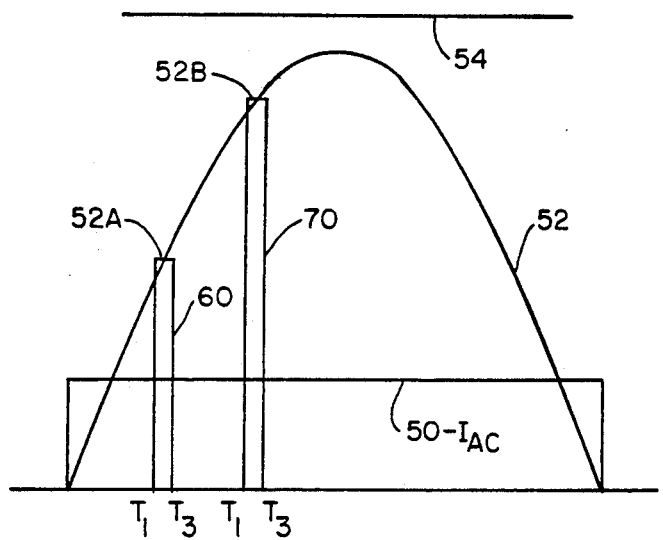
FIGS. 3B, 3C, and 3D are electrical wave forms showing operation of the controller in establishing an AC current of a desired magnitude.

The polarity of the voltages and direction of current flow are as shown in the schematic of FIG. 3A and the waveforms of FIG. 3B which shows the desired, constant magnitude current IAC (labelled 50 in FIG. 3), AC line voltage 52 and capacitor voltage 54. For purposes of understanding the relative polarities and magnitudes of the voltages, the horizontal axis of FIG. 3B is taken as the AC line neutral indicated by the ground symbol at terminal 15.

Modulation interval 60, shown in FIG. 3B is initially used for purposes of explanation. It is assumed that the DC voltage of capacitor 36 has been established at the level 54 greater than the peak voltage of AC voltage 52 of the AC power mains, as by operating controller 1 in quadrants I and III, as hereinafter described. It is also assumed that a current 50 has been established by the operation of controller 1, prior to modulation interval 60.

Figures 3C, 3D:
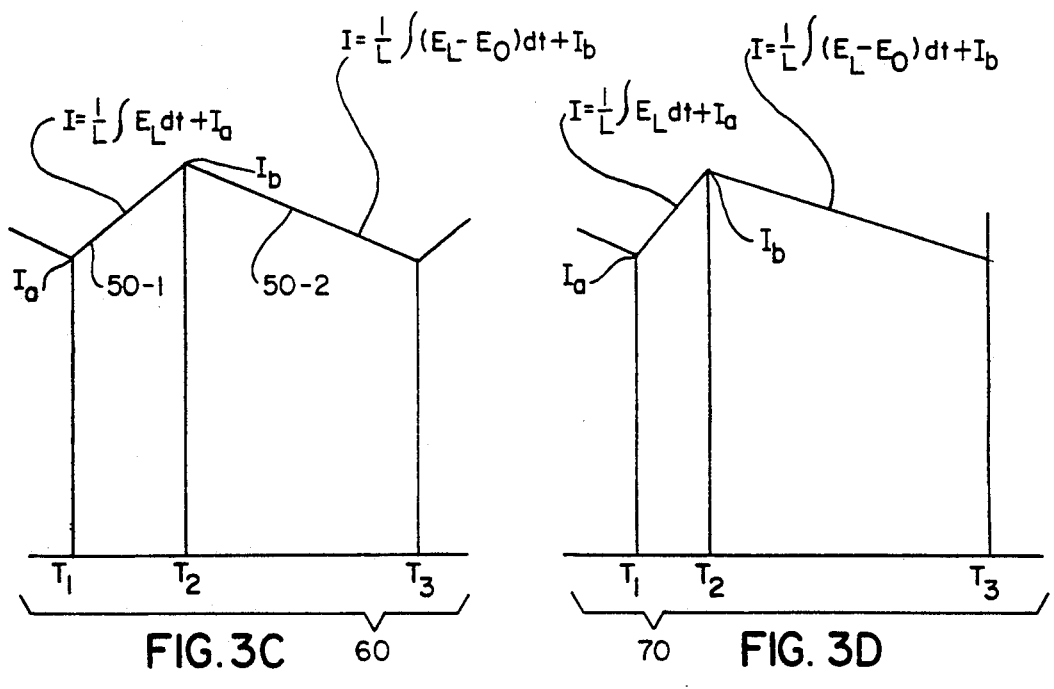

The duration of modulation interval 60 is shown in expanded form in FIG. 3C. As noted above, the pulse width modulation frequency is selected such that the modulation intervals are sufficiently short that the AC voltage 52 may be considered constant in the interval, as shown at 52A in FIG. 3B.

At time T1, switch 22-2 of configuration 20 is turned on or closed. Current 50, shown in FIG. 3A, flows out of positive AC terminal 13 in AC conductor 11 and through inductor 14 to terminal 25. It thereafter flows through closed switch 22-2 and diode 24-1 to terminal 26, AC conductor 12, and AC terminal 15. This current flow is identified by the solid arrows 50-1 shown in configuration 20 in FIG. 3A. The current flow is thus in the desired direction from positive AC terminal 13 to configuration terminals 25 and 26, and out AC terminal 15. Inductor 14 is essentially shorted across the AC line and no current flows in the DC portion 3 of controller 1.

FIG. 3C shows the pulse width modulation occurring in modulation interval 60 and the establishment of the magnitude of the current in greater detail. FIG. 3C shows time T1 shown in FIG. 3B. At time T1, the current flow identified as 50-1 commences. The magnitude of the current increases in accordance with Equation 1, noted above. Equation 1 is also shown in FIG. 3C. The slope of the current increase is inversely proportional to the magnitude of the inductance L of inductor 14 and directly proportional to the magnitude of the line voltage, identified as EL in the equation and as 52 in FIG. 3B. However since, as noted above, the instantaneous line voltage is assumed to be constant at 52A during the modulation interval and since the inductance L of inductor 14 is constant, the amount by which the current will increase after time T1 is proportional to the on time of switch 22-2. As shown in FIG. 2C, the current increase commences from the level of current Ia existing at the conclusion of the previous modulation interval. At time T2, the current has increased to current level Ib.

At time T2, the regulator for pulse width modulator 38 causes the pulse width modulator to turn switch 22-2 off. The inductive properties of inductor 14 are such as to tend to maintain current 50 through the inductor. When switch 22-2 is turned off, current 50 seeks the only available path in configuration 20, which is as follows. The current 50 now flows through diode 21-1 to positive DC bus 32 and through capacitor 36 to negative DC bus 34. From DC bus 34, the current flows through diode 24-1 and AC conductor 12 to AC terminal 15. These current flow paths through bridge 20 are shown by the dashed arrows 50-2 in FIG. 3A.

The magnitude of the current decreases subsequent to time T2 in accordance with the equation also shown in FIG. 3C, and as shown by the graph 50-2. Upon review of the formula shown in FIG. 3C, it will be appreciated that the slope of the current decrease is inversely proportional to the magnitude of the inductance L of inductor 14 and the difference between the line voltage EL and the capacitor voltage EO, shown as 54 in FIG. 3B. Inasmuch as the capacitor voltage is greater than the line voltage, the voltage quantity in the equation will be negative, in agreement with the decrease in the current shown in FIG. 3C.

Since the voltage quantity in the equation is different when switch 22-2 is off than when it is on, the slope of the current decrease is thus different than the slope of the current increase, also as shown in FIG. 3C. The current decrease commences from the level of current Ib existing at the end of the on time of switch 22-2 and extends to current level Ia at the conclusion of modulation interval 60 at time T3.

The currents 50-1 and 50-2 established during the time intervals T1-T2 and T2-T3 of modulation interval 60 are such as to maintain the current in AC lines 11 and 12 at the desired level 50 shown in FIG. 3B.

FIG. 3D shows operation of controller 1 at a subsequent modulation interval 70, including turn on of switch 22-2 at time T1, turn off of switch 22-2 at time T2 and the conclusion of the modulation interval at time T3. The current paths and sources are the same in interval 70 as in interval 60 shown in FIGS. 3A and B.

However, the voltage 52B occurring in modulation interval 170 is greater than voltage 52A occurring in modulation interval 60. In accordance with the formula shown in FIG. 3C and repeated in FIG. 3D, the slope of the current increase between times T1 and T2 in FIG. 3D will be greater than that for FIG. 3C because the voltage 52B is greater. Conversely, the slope of the current decrease between times T2 and T3 will be less because the quantity (EL-EO) will be less. FIG. 3D shows the different current patterns in modulation interval 70 over those of the modulation interval 60 shown in FIG. 3C. Pulse width modulator 38 will alter the duty cycle of switch 22-2, i.e. the relative on-off times of switch 22-2 in modulation interval 70, so as to provide currents 50-1 and 50-2 that maintain the current in AC conductors 11 and 12 and the current taken from the AC power mains at the desired level 50. Since the voltage 52B in interval 70 is greater than the voltage 52A in interval 60, the desired level of current 50 can be maintained with a shorter on time or duty cycle for switch 22-2 in modulation interval 70.

The operation of controller 1 in each of the modulation intervals established by pulse width modulator 38 during the half cycle of AC line voltage 52 shown in FIG. 3B is analogous to that specifically described above in connection with intervals 60 and 70.

Figure 2A:
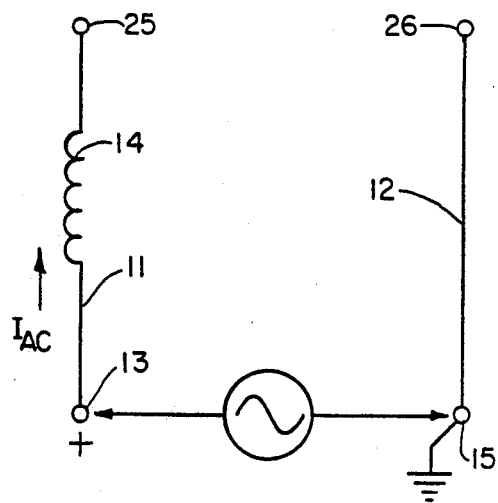
FIGS. 2A through 2D show various combinations of instantaneous AC voltage polarity and AC current flow direction, termed operating quadrants.
Figure 2B:
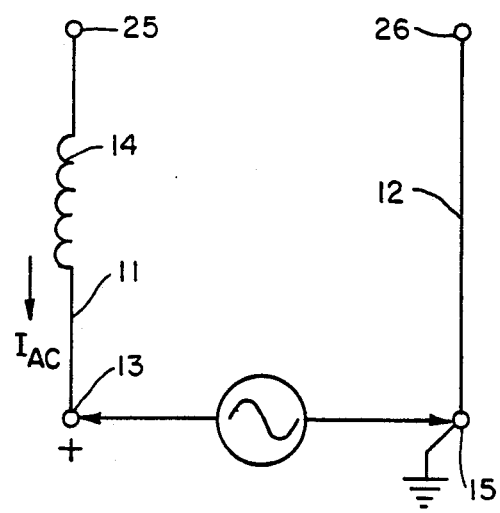
Figure 2C:
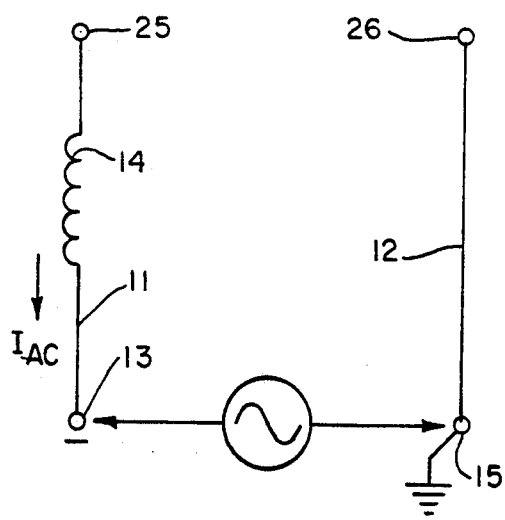
Figure 2D:
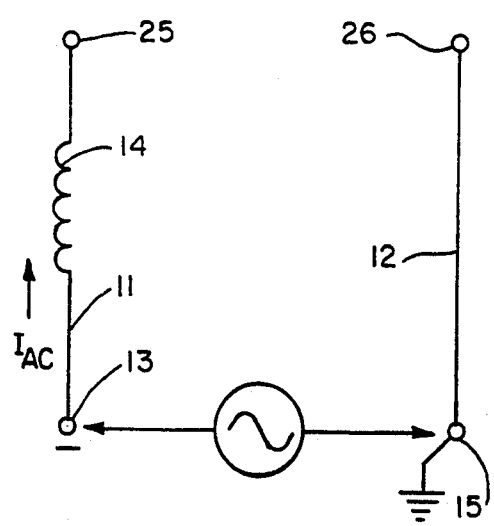

If it is desired to alter the current in AC conductors 11 and 12, to a different level from level 50 shown in FIGS. 2B, the duty cycle of switch 22-2 is altered. For example, to increase the current, the duty cycle is increased. That is, the time interval T1-T2 is increased and the time interval T2-T3 is decreased for a modulation interval or a succession of modulation intervals. This increases the current in the AC conductors 11 and 12. Once the desired new current level has been reached, the operation of controller 1 reverts to that necessary to maintain the current at the new level, as shown in FIGS. 3A-3D and described above. To decrease the current, the duty cycle of switch 22-2 is decreased.

In the foregoing manner, the level of current 50 in AC conductors 11 and 12 and the AC portion 2 of controller 1 can be established at any desired level under the conditions characterizing quadrant I.

It will be appreciated that while use of switch 22-2 and diodes 21-1 and 24-1 has been described, the use of switch 23-2 and diodes 21-1 and 24-1 will achieve the same result.

Figure 4A:
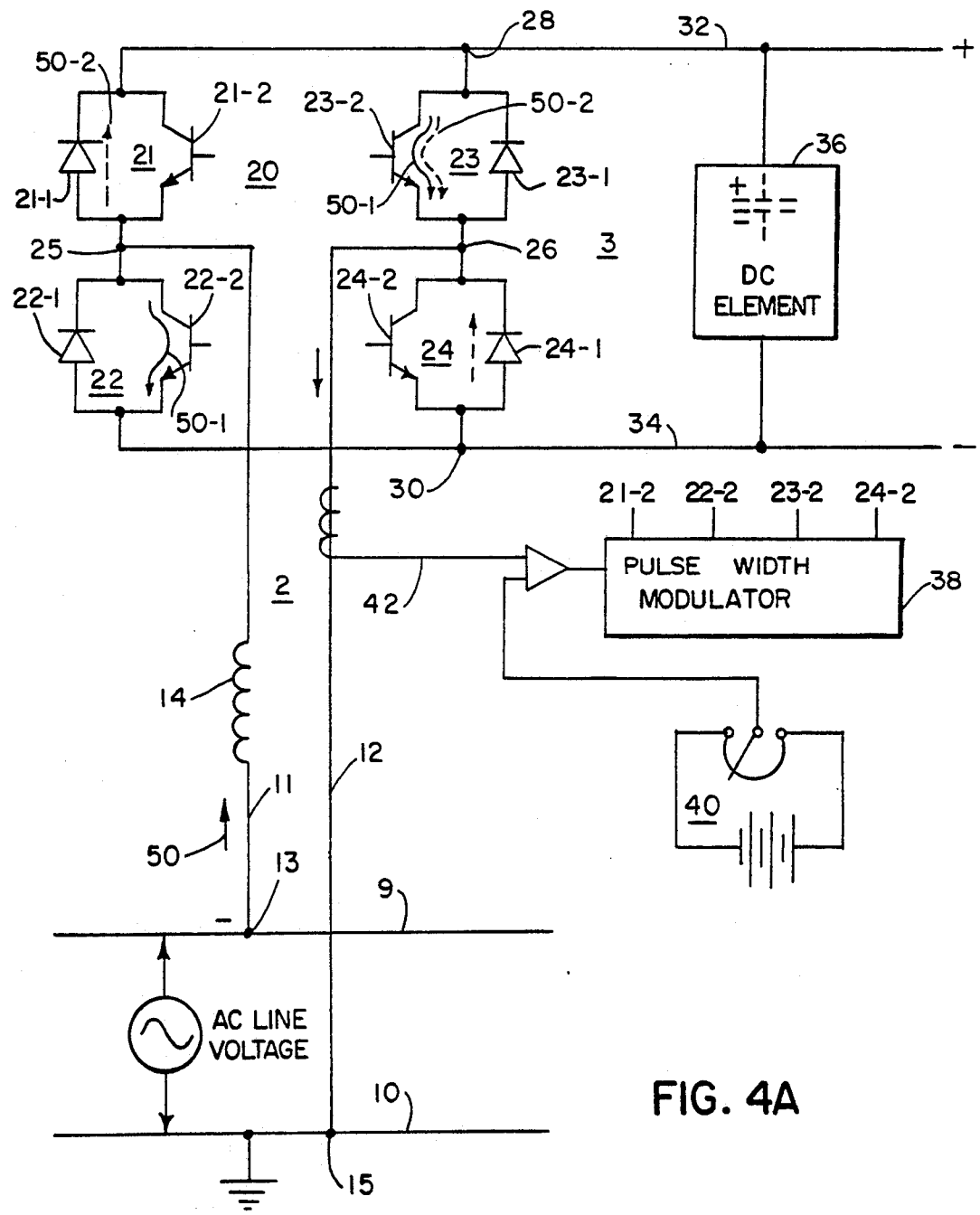
FIGS. 4A through 4C are analogous to FIGS. 3A through 3D and show operation of the controller of the present invention in quadrant IV.

The polarity of AC voltage 52 periodically reverses. If it is desired to establish the same direction of current flow in AC conductors 11 and 12, notwithstanding the reversal of AC voltage 52, the operation of controller 1 as follows, and as shown in FIG. 4. Under these conditions, AC terminal 13 is negative with respect to neutral terminal 15. It will be appreciated under conditions in which the flow direction of current 50 remains the same but the polarity of the AC voltage 52 reverses, controller 1 will function as a source of electrical energy for the AC power mains as a load. The operation of controller 1 is in quadrant IV. The example shown in FIG.

4 assumes the level of the current will remain the same, i.e. at the level 50.

Figure 4B:
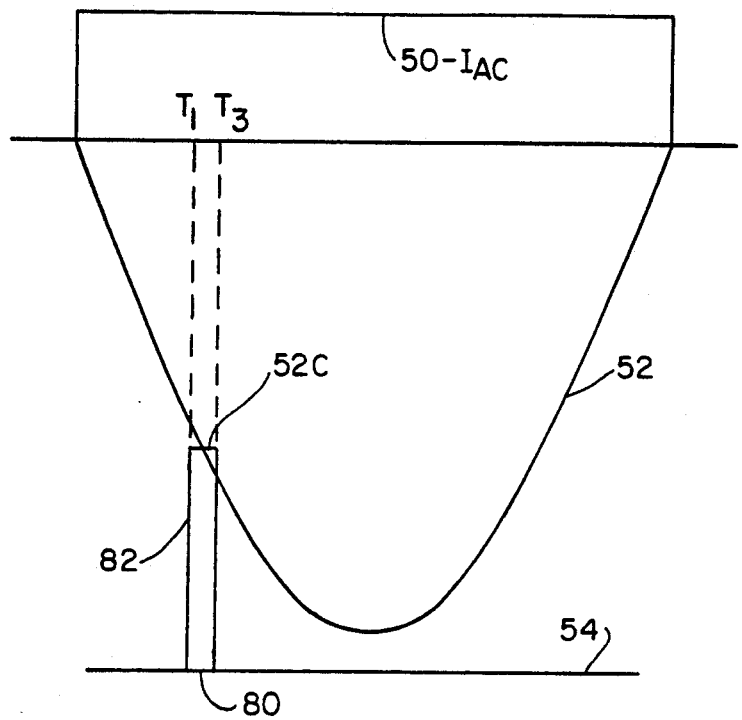

At time T1 in modulation interval 80 shown in FIG. 4B, switch 22-2 and switch 23-2 are turned on or closed. This creates a current path through inductor 14 and configuration 20 as follows. Since controller 1 is acting as an electrical source, current flows out the positive plate of capacitor 36, through switch 23-2, AC conductor 12, the AC power mains, AC conductor 11, inductor 14, switch 22-2, and back to the negative plate of capacitor 36. Since this current flows in the AC conductors 11 and 12 and in inductor 14, it is AC current 50. This current flow is identified by the solid arrows 50-1 shown in configuration 20 in FIG. 4A. The current flow is in the desired direction of in AC terminal 13 and out AC terminal 15. A review of FIG. 4A will indicate that switch 23-2 connects DC terminal 28 to AC terminal 26. Thus, the positive plate of capacitor 36 is connected to neutral terminal 15. The negative plate of capacitor 36 is connected through switch 22-2 to inductor 14. This accounts for the relative voltages and polarities shown in FIG. 4C in which voltage 54 is negative with respect to AC line neutral.

Figure 4C:
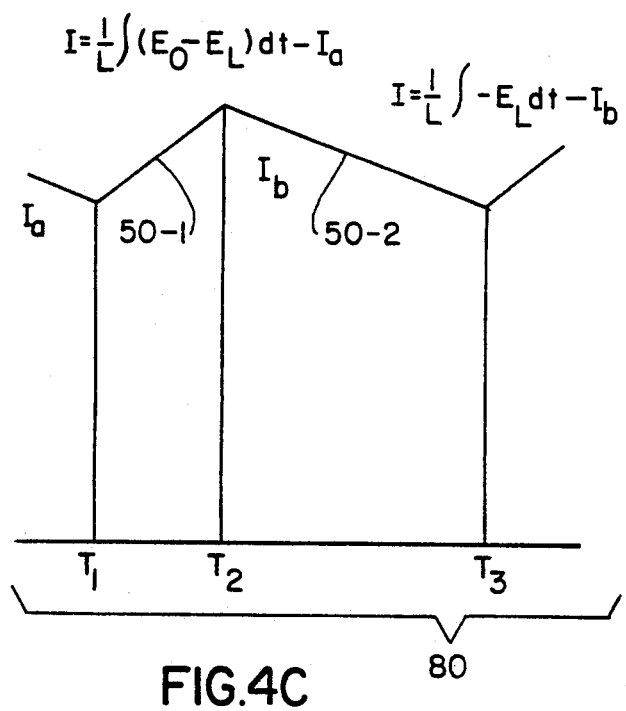

FIG. 4C shows the pulse width modulation occurring in modulation interval 80 and the establishment of the magnitude of the current in greater detail. At time T1, current flow 50-1 commences. The magnitude of the current in the on portion of the duty cycle of the modulation interval, increases in accordance with the equation shown in FIG. 4C which shows the pulse width modulation occurring in modulation interval 80 and the establishment of current 50 in greater detail. At time T1, current flow identified as 50-1 commences. The magnitude of the current increases in accordance with the equation shown in FIG. 4C. Upon review of the equation, it will be appreciated that the voltage that is driving current 50 is the voltage difference between the capacitor voltage, shown as Eo in the equation and as 54 in FIG. 4B and the AC line voltage, shown as EL in the equation and 52C in FIG. 4B. This voltage difference is shown in FIG. 4B as voltage 82. As shown in FIG. 4C, the current increase commences from the level of current Ia existing at the conclusion of the previous modulation interval. At time T2, the current has increased to current level Ib.

At time T2, the regulator for pulse width modulator 38 causes the pulse width modulator to turn switch 22-2 off. Switch 23-2 remains on. Current 50 in controller 1, shown in FIG. 4A, now flows from AC conductor 11 through inductor 14, diode 21-1, switch 23-2, AC conductor 12, the AC power mains, and back to AC conductor 11. The current flow paths through configuration 20 are shown by the dashed arrows 50-2 in FIG. 4A. It will be appreciated that subsequent to time T2, inductor 14 is essentially shorted across the AC power mains and serves to provide current 50.

By switching 22-2 on or off, the negative voltage of capacitor 36 can be applied or removed from inductor 14. This is shown in the two equations of FIG. 4C where the voltage Eo is present or absent.

The magnitude of the current decreases subsequent to time T2 in accordance with the equation also shown in FIG. 4C, as shown by the graph 50-2. Upon review of the formula shown in FIG. 4C, it will be appreciated that the slope of the current decrease is determined by the magnitude line voltage EL, shown as 52 in FIG. 4B. Inasmuch as the voltage polarity has reversed over that shown in FIG. 3B, the voltage quantity in the equation will be negative, thereby to arrive at a decrease in the current. The current decrease commences from the level of current Ib existing at the end of the on time of switch 22-2 and extends to current level Ia at the conclusion of modulation interval 80 at time T3.

The current 50-1 provided by capacitor 36 in the interval T1–T2 and the current 50-2 provided by the inductor during the time interval T2–T3 are such as to maintain the current in AC lines 11 and 12 at the desired level 50 shown in FIG. 4B.

The operation of controller 1 in subsequent modulation intervals in the half cycle of AC line voltage 52 is analogous to the operation described above in connection with modulation interval 80. Since the voltage difference 80 decreases as the peak voltage of AC line voltage is approached, the duty cycle of switch 22-2 must be increased in modulation intervals subsequent to interval 80 and prior to the peak AC voltage.

It will be appreciated that while the modulation of switch 22-2 has been described above, the desired operation of controller 1 could be achieved by leaving switch 22-2 on and modulating switch 23-2.

The desired operation that provides a current increasing time portion and a current decreasing time portion in each modulating interval may also be obtained by modulating both switches 23-2 and 22-2. In this case, current 50-2 would flow through diode 21-1, capacitor 36, and diode 24-1, with a current reducing voltage applied to inductor 14 being equal to the sum of the line voltage EL and the capacitor voltage Eo.

The operation of controller 1 in quadrants II and III is analogous to the operation of the controller in quadrants I and IV described above. Specifically, in quadrant II, the polarity of AC voltage 52 is the same as in quadrant I but the direction of current flow is reversed so that it flows out terminal 13. To increase current 50 in the T1–T2 portion of each modulation interval, switches 21-2 and 24-2 are turned on to apply the voltage difference between that of capacitor 36 and the AC line voltage to inductor 14. To decrease current 50 in the T2–T3 portion of each modulation interval, switch 24-2 is turned off and current flows in configuration 20 through switch 21-2 and diode 23-1. Or, switch 21-2 could be turned off and current flow obtained by switch 24-2 and diode 22-1. Or, both switches 21-2 and 24-2 could be modulated simultaneously.

In quadrant III, the polarity of AC voltage 52 is the same as in quadrant IV, i.e. terminal 13 is negative, but the direction of current flow is reversed so that it flows out terminal 13. To increase current 50 in the T1–T2 portion of each modulation interval, switch 21-2 is turned on. Current flows in configuration 20 through diode 23-1 and switch 21-2. To decrease current 50 in the T1–T3 portion of each modulation interval, switch 21-2 is turned off and current flows in configuration 20 through diode 23-1, capacitor 36 and diode 22-1. Or, switch 24-2 can be modulated to obtain the desired current control, with current flow through switch 24-2 and diode 22-1 for the time portion T1 to T2 and through diode 23-1, capacitor 36, and diode 22-1 for the time period T2 to T3.

Figure 5:
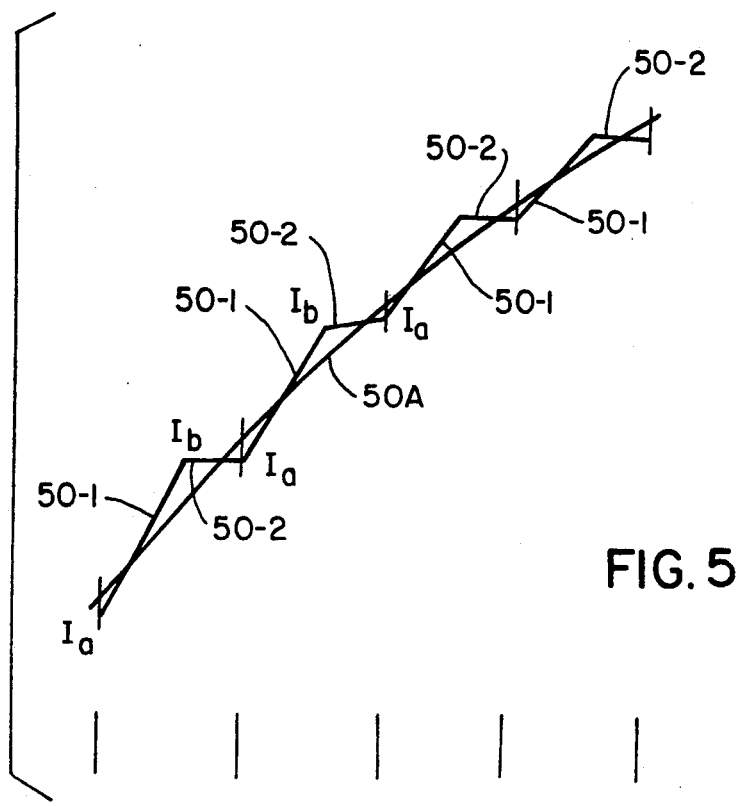
FIG. 5 is an electrical wave form diagram showing generation of a sinusoidal current wave form by operation of the controller of the present invention.

While current 50 is shown in FIGS. 3 and 4 as having a constant value for exemplary purposes, it will be appreciated that the current may be made to have varying level to create any magnitude or wave shape profile desired. For example, if it is desired to provide a sinusoidal wave form to current 50, reference source 40 for pulse width modulator 38 would comprise a sine wave generator so that the regulating action of reference source 40, feed back means 42 and pulse width modulator 38 operate controller 1 to cause current 50 to have a sinusoidal wave form. The operation of controller 1 in producing a sine wave is shown diagrammatically in FIG. 5 in a manner resembling FIGS. 3C and 3D and 4C and 4D. FIG. 5 shows a fragmentary portion of a sinusoidal current 50A and the pulse width modulated currents 50-1 and 50-2 in a plurality of modulation intervals, shown on the abscissa of FIG. 5, that form the sinusoidal current.

The sizing of inductor 14 is a compromise between the ability to change current rapidly in controller 1 and the amount of ripple, as shown in FIGS. 3C, 3D, 4C, and 5, that is acceptable in the controlled current. If necessary, the amount of ripple can be reduced by a filter placed across the AC portion 2 of the controller. For a controller capable of handling 1 kilowatt of power and operating at a modulating frequency of 15 kiloHertz, the inductance of inductor 14 is typically 2 millihenries.

FIGS. 6A and 6B through 6E are a schematic diagram and graphs, respectively, which depict a circuitry and its operation which may be used to determine in which of the four quadrants the bridge rectifier should operate, and to determine which switches 21-2, 22-2, 23-2, and 24-2 are to be turned on and off in the pulse width modulation provided by pulse width modulator 38.

Figure 6A:
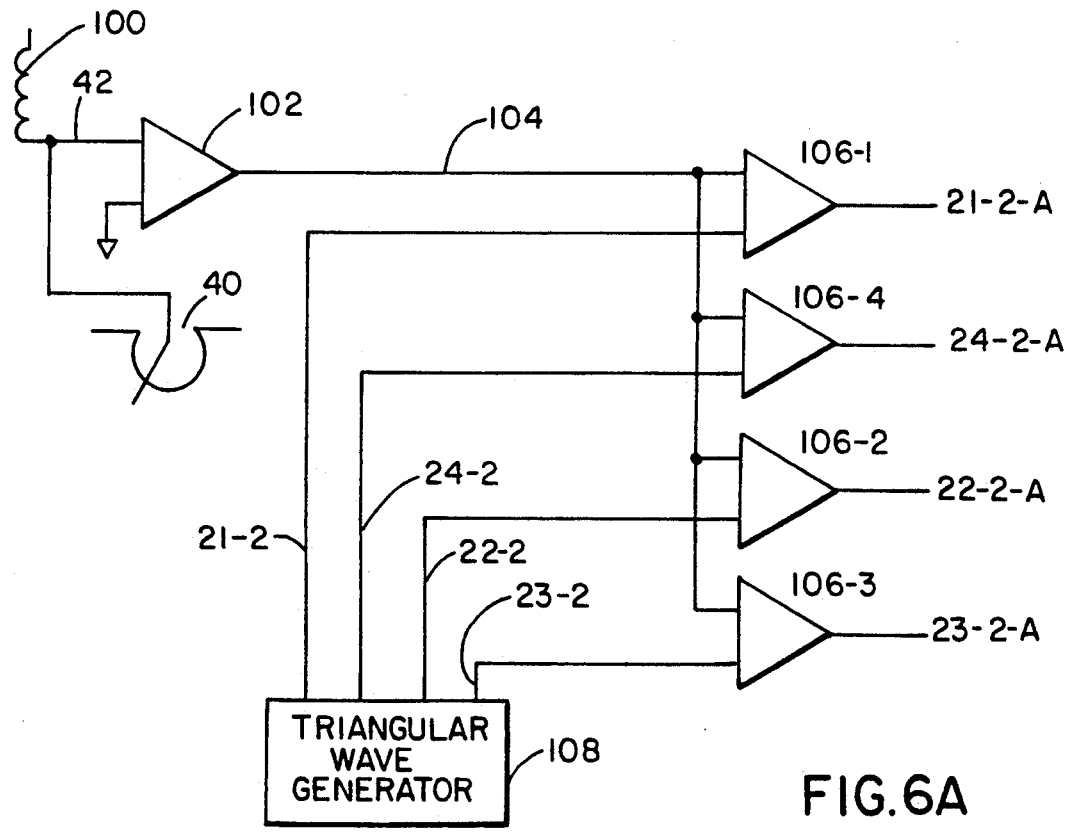
FIG. 6A shows a schematic diagram of a simplified pulse width modulator suitable for use in the controller of the present invention.

FIG. 6A shows reference source 40 and current feedback means 42. Current feedback means includes a current sensor 100 such as a current transformer coupled to one of AC conductors 11 or 12. The output of current sensor 100 and reference source 40 are summed at a summing junction and provided to regulating amplifier 102. A current error signal is provided in conductor 104.

In each of the quadrants, the output of current regulating amplifier 102 present in conductor 104 is compared in comparators 106-1, 106-2, 106-3, and 106-4 to four triangular wave form voltages generated by triangular wave generator 108. In FIGS. 6B through 6E, the waveforms are identified by the number of the switches which they operate. As shown in FIGS. 6B through 6E, the triangular waveform used to operate switches 21-2 and 24-2 are positive in polarity, and the triangular waves corresponding to switches 23-2 and 22-2 are negative in polarity. Waveform 21-2 is more positive than waveform 24-2 and waveform 23-2 is more negative than waveform 23-2.

A switch is turned on whenever the output of amplifier 102 is more positive than any portion of the positive triangular waveforms, and whenever the amplifier output is more negative than any portion of the negative triangular waveforms.

Applying the foregoing operative criteria to FIG. 6B, the operation of controller 10 is as follows. It is seen that only switch 22-2 is turned on by comparator 106-2 when the output of amplifier 102 is negative in polarity and near the positive peaks of the corresponding triangular waveform 22-2 in magnitude. It is only near those points that the current regulating amplifier output in conductor 104 is more negative than the triangular wave 22-2 corresponding to switch 22-2. Use of switch 22-2 characterizes operation of controller 1 in quadrant I. The output signal from comparator 106-2 to switch 22-2 is shown in FIGS. 6A and 6B by the numeral 22-2-A.

It is also noted that switch 23-2 remains off in quadrant I operation since the output of amplifier 54 is never more negative than the triangular waveform corresponding to switch 23-2. Also, switches 21-2 and 24-2 remain off since the regulating amplifier output is never positive, and thus there is no amplifier output that could be more positive than the positive triangular waveforms corresponding to switches 21-2 and 24-2.

In the quadrant II operation depicted in FIG. 6C, the output of regulating amplifier 102 is of a large positive magnitude. Since the amplifier output is more positive than the triangular waveform 21-2 corresponding to switch 21-2 only hear the valleys of that triangular waveform, switch 21-2 is turned on only when its corresponding triangular waveform is near those valleys. Since the amplifier output is always more positive than the triangular waveform corresponding to switch 24-2, switch 24-2 remains continuously on. The other switches 23-2 and 22-2 remain off since the amplifier output is never more negative than these triangular waveforms in quadrant II operation. The switching signals 21-2A and 24-2-A are shown in FIG. 6C. The above described switching operation is one of the alternative switching operations described in connection with the detailed operation of controller 1 in quadrant II.

In the quadrant III operation depicted in FIG. 6D, the output of amplifier 102 is only somewhat positive. However, the amplifier output is still more positive than the valleys of the triangular waveform 24-2 corresponding to switch 24-2. Thus, switch 24-2 is turned on when its corresponding triangular waveform is near those valleys. Since the amplifier output is never more positive than the triangular waveform 21-2 corresponding to switch 21-2, switch 21-2 remains off. Also, the amplifier output is never more negative than the triangular waveforms 22-2 and 23-2 corresponding to switches 23-2 and 22-2. Thus, these switches remain off in quadrant III operation.

In FIG. 6E, the regulating amplifier output is very negative. Since the amplifier output is more negative than the triangular waveform 23-2 corresponding to switch 23-2 when that triangular wave is near its peaks, switch 23-2 is turned on near those peaks. Switch 22-2 remains continuously on since the regulating amplifier output is always more negative than the triangular waveform 22-2 corresponding to switch 22-2. Also, switches 21-2 and 24-2 remain off since the amplifier output is never more positive than the triangular waves corresponding to switches 21-2 and 24-2. This is operation of controller 1 in quadrant IV and utilizes one of the alternative switching operations of configuration 20 for quadrant IV previously described.

In the method of modulating the conduction of the switches 21-2, 22-2, 23-2, and 24-2 in configuration 20 described above and shown in FIGS. 6A through 6E, the output of a current regulating amplifier is compared to triangular wave forms to determine which switches in configuration 20 are operated and the interval of conduction of those switches.

The further aspect of the operation of controller 1 in connection with the four quadrants of operation described above is to be noted. Assume controller 1 is generating a sinusoidal current in AC portion 2 and operating in quadrant I. Shortly after the zero crossing of the sinusoidal current, the magnitude of the AC line voltage, shown as EL in the formula in FIG. 3C is not sufficient to build up the current rapidly enough to generate current of the required magnitude to form a sine wave, for example, the sinusoidal current 50A shown in FIG. 5.

However, the voltage of capacitor 36 can be used to provide a voltage in addition to the voltage of AC line and of the same polarity across inductor 14 by operating the switches 23-2 and 22-2 normally used in quadrant IV operation, thereby to obtain sufficient voltage to generate the sinusoidal current. Under conditions around zero crossing of a sine wave current into quadrant I, if operation of switch 22-2 used in quadrant I is not sufficient to establish the desired current in controller 1, the signal in conductor 104 from regulating amplifier 102 will increase in a negative direction shown in FIG. 6, automatically changing the operation of configuration to that of quadrant IV. In effect, the controller "borrows" additional voltage from capacitor 36 for use with the AC line voltage to establish the required current.

As soon as the AC line voltage reaches a magnitude sufficient to generate the required current by itself, the operation of configuration 20 reverts to quadrant I operation. The operation of configuration in other quadrants is analogous to that described above.

Several other methods beyond the pulse width modulation described above can be used to accomplish control of the current in inductor 14 that is in series with the AC input to the controller.

In the above described pulse width modulation operation, the alternate switching between a current increasing switch condition in configuration 20 and a current decreasing condition operates at a constant frequency and the total time of two conditions is a constant value. The amount of time, or "width" allocated to the current increasing condition is varied with respect to the total time to increase, decrease, or maintain the current in inductor 14.

Variations in the relative proportion of current increasing conditions and current decreasing conditions in controller 20 can also be accomplished by operating the switches in configuration 20 to the current increasing state for periods of time that are equal, but varying the frequency or occurrence of the active periods. This operation characterizes pulse frequency modulation.

Two further alternative modulation methods are described below, and it is recognized that additional means for selecting the switches and determining the conduction periods may be used.

Figure 7A:
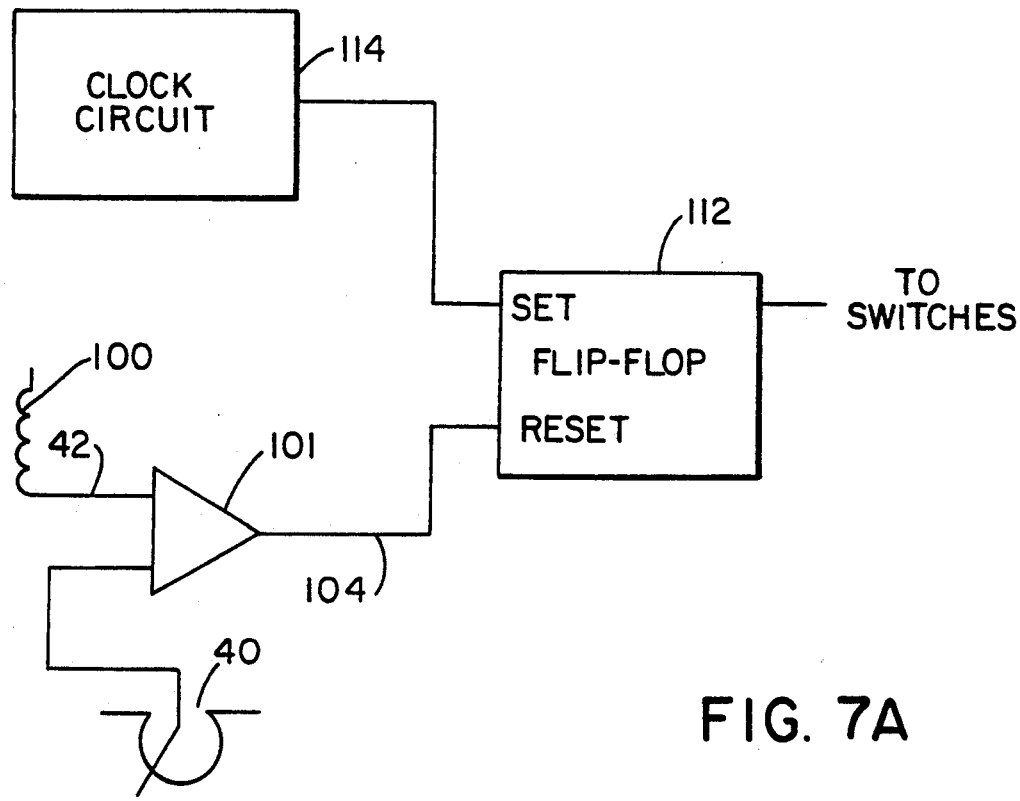
FIGS. 7A through 7D show alternative techniques for carrying out the operation of the controller of the present invention.
Figure 7B:
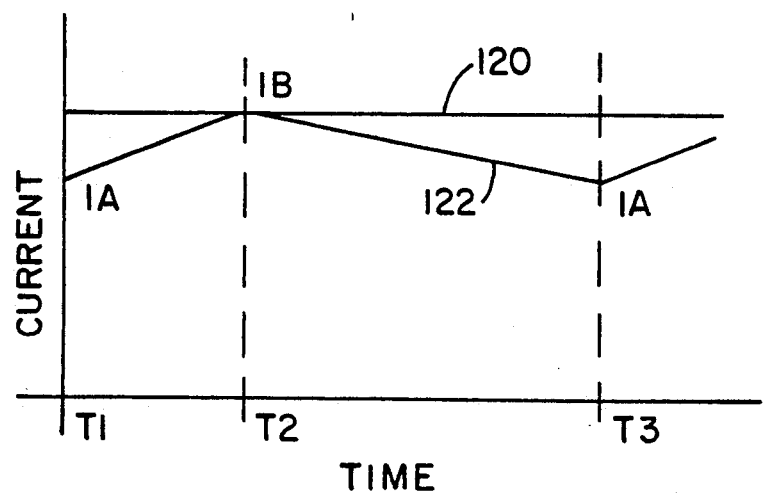

Another method of control may be termed "current mode" control and is shown in FIGS. 7A and 7B. As shown in FIG. 7A, the output of comparator 101 in conductor 104 is connected to the reset input of flip-flop 112. The set input of the flip-flop is connected to clock circuit 114 that provides a clock signal, the frequency of which corresponds to the desired modulating frequency. The output of flip-flop 112 comprises the switching signal. Which switches are to be operated by the output of flip-flop 112 is determined by an appropriate logic circuit. For example, the circuitry of FIG. 6 could be modified to provide the appropriate logic signals.

The operation of the circuitry of FIG. 7A is shown in FIG. 7B.

FIG. 7B shows a current reference signal 120 from a reference signal source such as 40 shown in FIG. 7A. Current reference signal 120 represents the desired level of current in inductor 14. A feedback signal proportional to actual inductor current, and therefore the AC current in the controller is shown as current feedback signal 122. The switching or modulating frequency is established by clock circuit 114 that is sufficiently higher than the AC line frequency so that the magnitude of current reference signal 120 can be considered constant for a period of the switching frequency.

At the beginning of each modulation interval, i.e. at time T1 in FIG. 7B, clock circuit 114 operates flip-flop 112 so that an appropriate selection of switches are turned on in configuration 20 which will cause the inductor current to increase. The current through inductor 14, and hence current feedback signal 122 increases at the rate proportional to the voltage applied to inductor 14 and inversely proportional to the inductance of the inductor. When the inductor current reaches the level 1B corresponding to that established by reference signal 120, comparator 101 detects the coincidence and operates flip-flop 112 to change the selection of on switches in configuration 20 to one that will cause the inductor current to decrease. The change in the condition of the switches occurs at time T2 in FIG. 7B. At time T3, i.e. the beginning of the next modulation interval, the initial configuration of the switches is again turned on by clock circuit 114 and flip-flop 112.

It will be appreciated that the average value of current obtained by this method is halfway between the values at 1A and 1B, and thus is not exactly equal to the desired value 120. However, if the excursions of current from 1A to 1B are kept small due to the magnitude of inductance of inductor 14, the average current will closely approximate the desired value.

Figure 7C:
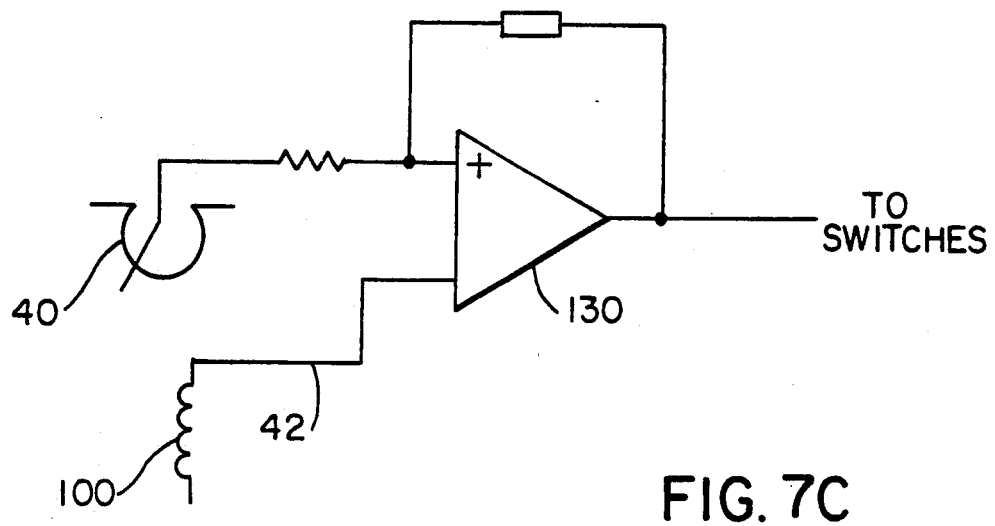
Figure 7D:
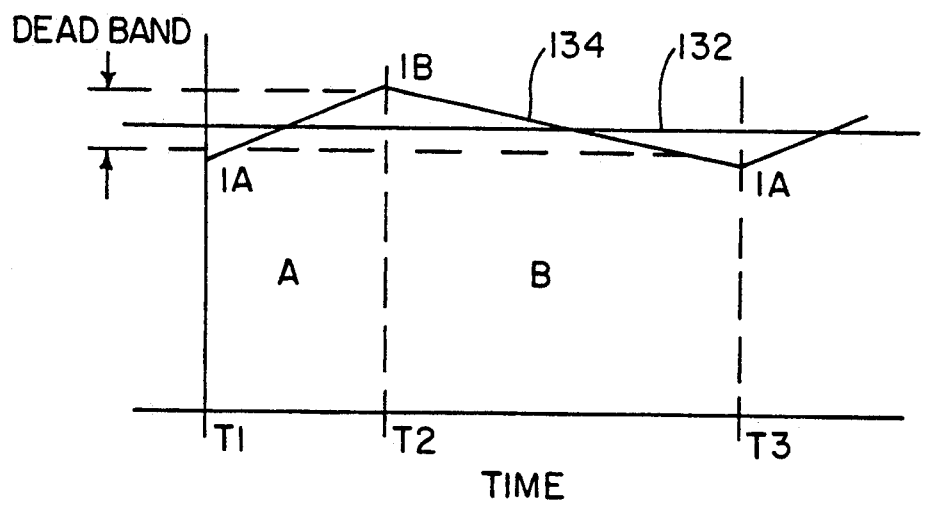

A further method of modulating the switching action is shown in FIGS. 7C and 7D. This method may be termed the "bang-bang" approach. With this method, a comparator 130 is used to switch between a current-increasing selection of switches and a current-decreasing selection of switches, depending on the relative magnitude of reference signal 132 from source 40 and feedback signal 134 from current sensor 100 supplied to the comparator.

The comparator is designed with a "dead band", or hysteresis, for switching between an inductor current increasing selection of switches and an inductor current decreasing selection of switches. This may be accomplished by appropriate elements 136 in the feedback path of the amplifier forming comparator 130. If the feedback signal 134 is outside the dead band, as shown in exaggerated form in FIG. 7D, and the reference signal 132 is greater than the feedback signal 134, the comparator will turn on a current increasing selection of switches in configuration 20, and the current will increase as shown in interval A of FIG. 7D. The rate of increase is determined by the same relationships as exemplarily represented in FIG. 3C. This condition exists between time T1 and T2 in FIG. 7D.

At time T2, the inductor current and feedback signal 134 have increased so that signal 134 exceeds the reference signal 132 and is again outside the dead band. The comparator switches the controller to a current decreasing selection of switches. Thus from time T2 to T3, the current in the inductor decreases at a rate determined by the same relationships between times T2 and T3 exemplarily represented in FIG. 3C. It can be seen from FIG. 7D that the average current will be equal to that called for by reference signal 132. That is, the areas under graph 134 above and below graph 132 are equal.

The frequency of switching with the "bang-bang" approach is not fixed, and depends on various factors relating to the change of the inductor current, such as the voltage available at the AC input to the controller, the DC voltage in the DC portion of the controller, the desired rate of change in average current in the inductor, and other factors. The method shown in FIGS. 7C and 7D, thus employs both pulse frequency modulation control and pulse width modulation control.

Figure 8:
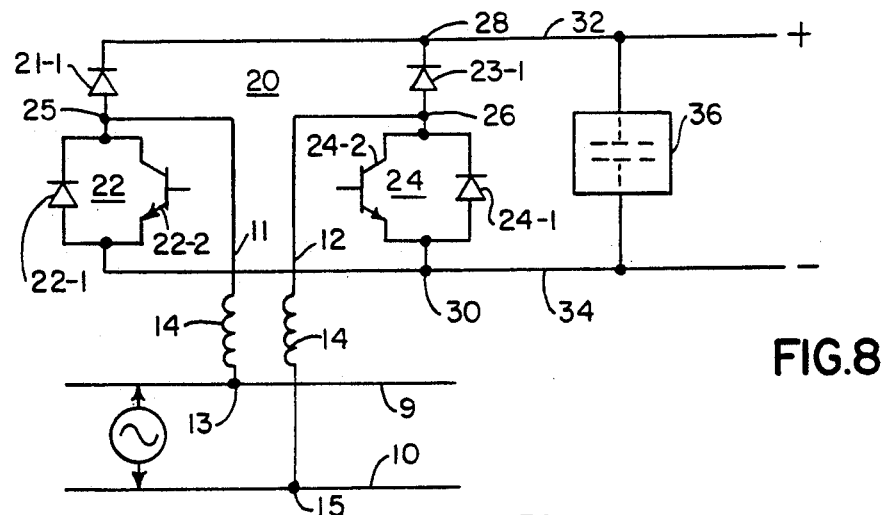
FIG. 8 shows a modification of the inductor and configuration components of the controller of the present invention.

It is also possible to modify structure of controller 1 in numerous other respects. For example, while inductor 14 is shown as a single element in conductor 11, inductor 14 could be split, with a portion of the inductor placed in each of AC conductors 11 and 12, as shown in FIG. 8. Such an inductor configuration assists in rendering controller 1 less susceptible to stray capacitance effects at the frequency at which the switches in configuration 20 are switched.

Figure 13:
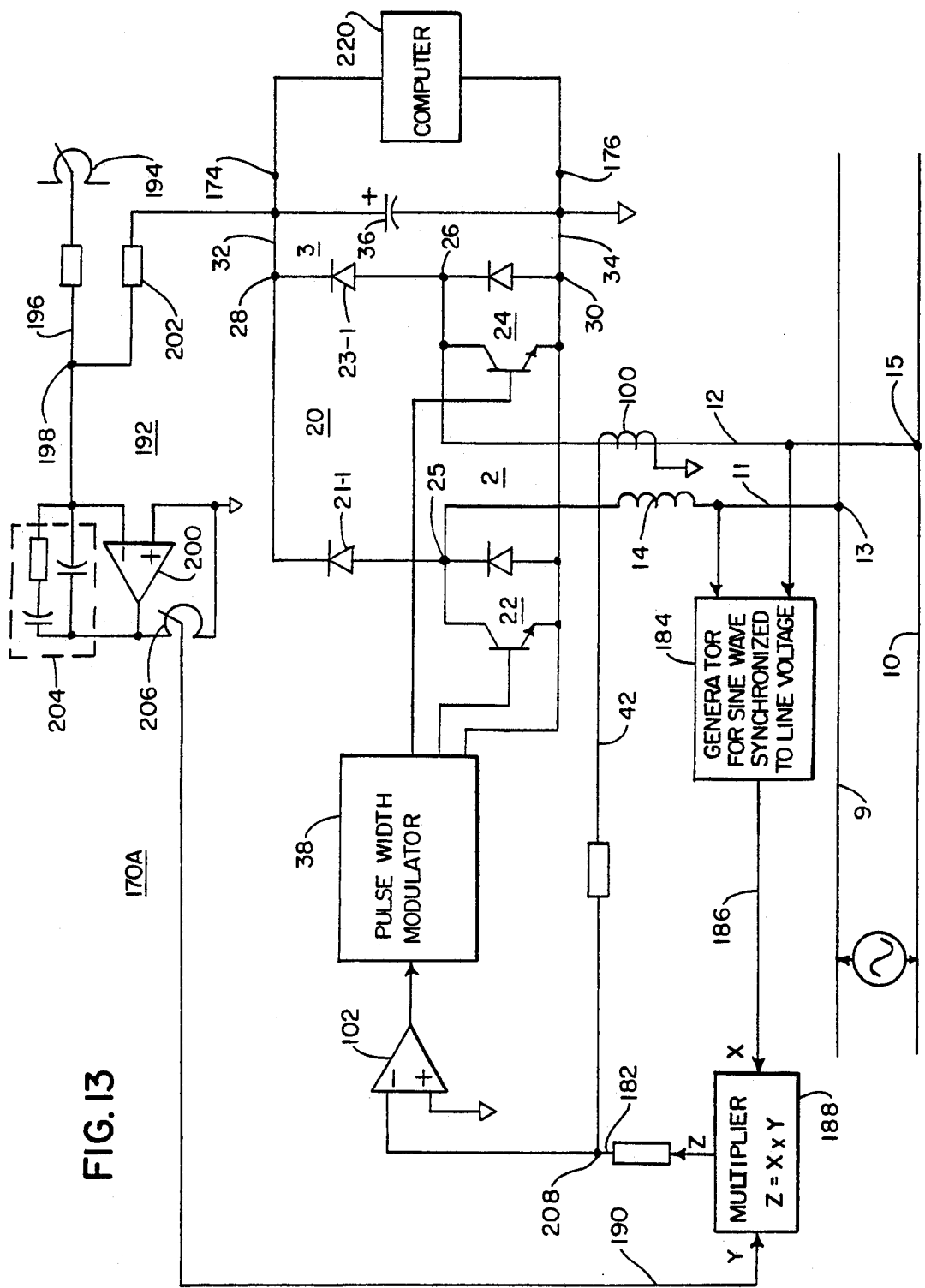
FIG. 13 shows use of the controller of the present invention as a unidirectional power supply.

Numerous modifications may be carried out with respect to configuration 20. For example, if the regenerative operation hereinafter described is not required, operation in all four quadrants is not necessary. Two switches may be eliminated from configuration 20, as shown in FIGS. 8 and 13. For example, switches 21-2 and 23-2 may be omitted, leaving switches 22-2 and 24-2. A controller having such a configuration will operate in quadrants I and III. AC lines will supply current to DC element 36 but no absorption or regeneration of power from DC element 36 or other electrical element across DC buses 32 and 34 to the AC power mains 9 and 10 will occur.

Figure 9:
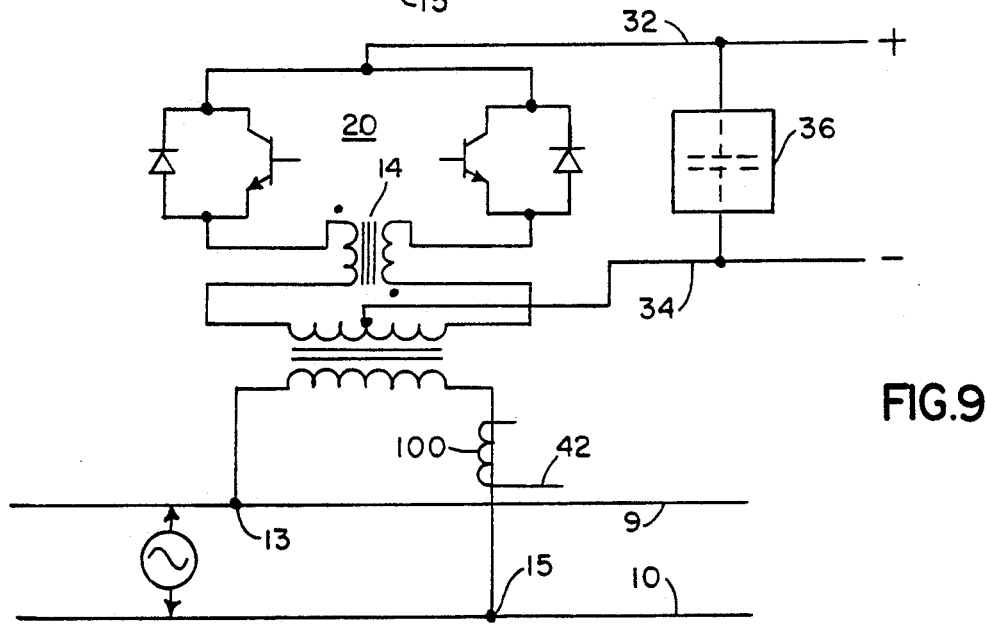
FIG. 9 shows a further modification of the controller the present invention.

FIG. 9 shows the use of a center-tapped transformer in the controller of the present invention and the corresponding modification to inductor 14.

Figure 10A:
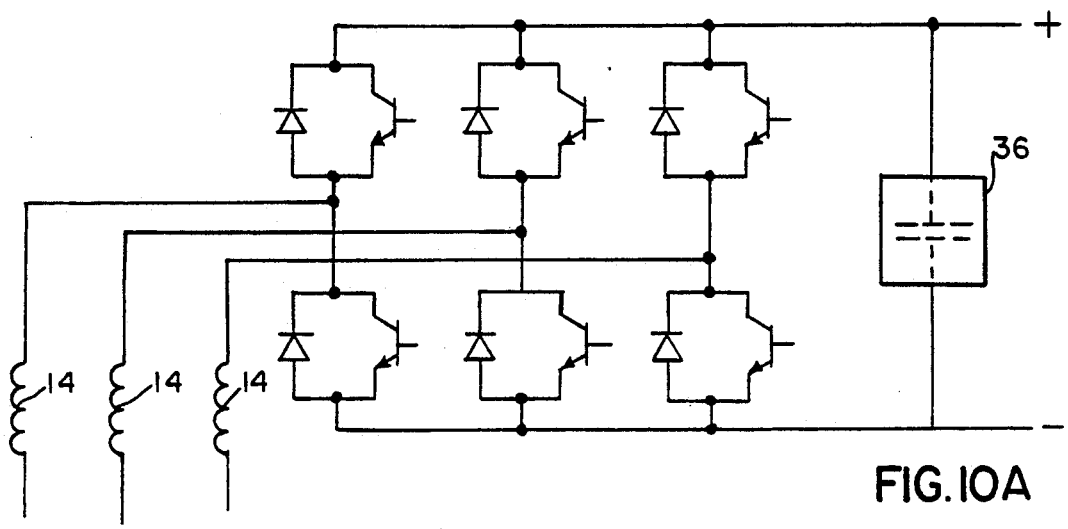
FIG. 10A and 10B show a polyphase embodiment of the controller.

FIG. 10A shows a polyphase embodiment of the controller of the present invention.

Figure 10B:
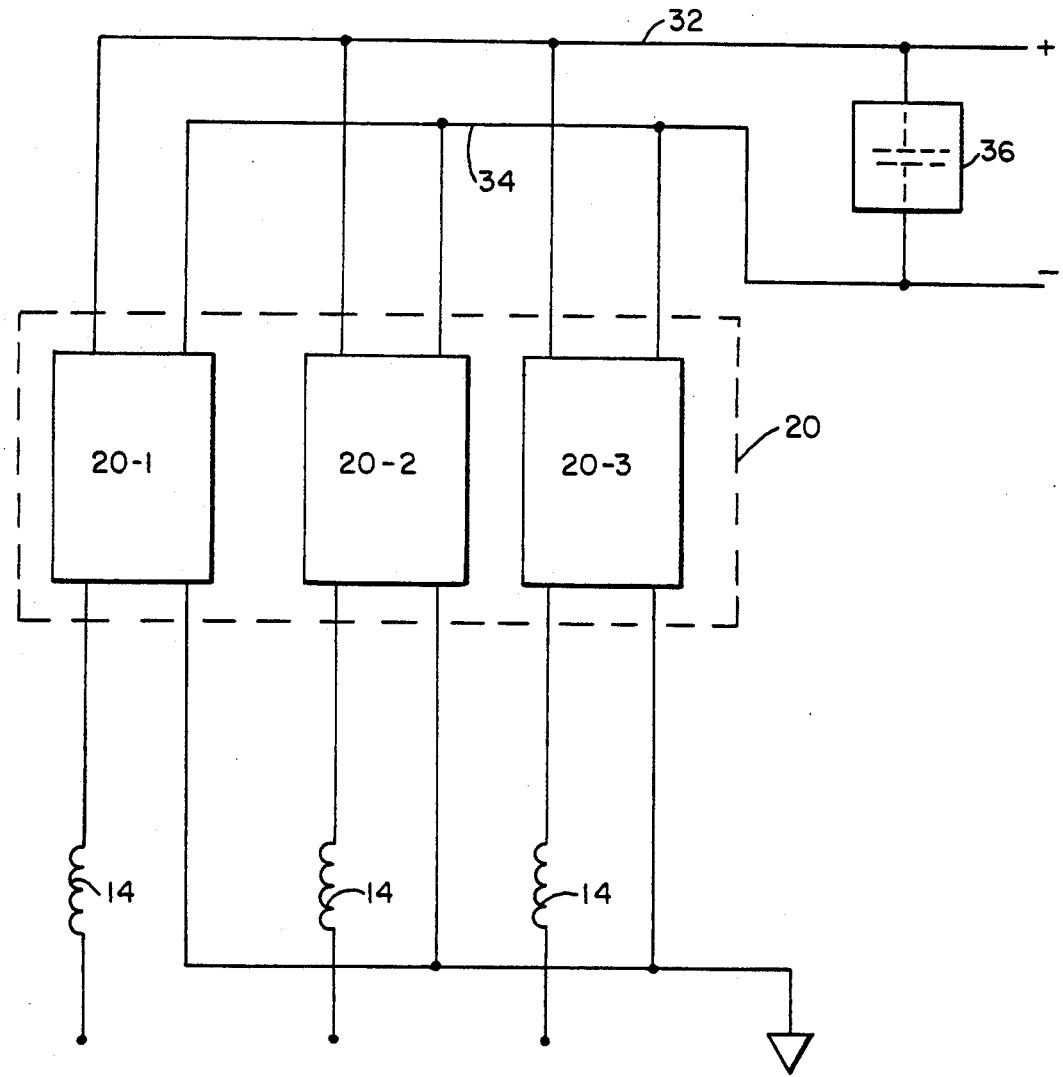

FIG. 10B shows a wye connected polyphase embodiment of the controller of the present invention having three configurations 20-1, 20-2, and 20-3. The configurations may be of the regenerative or non-regenerative type. The configurations may be arranged in an analogous manner in delta connected polyphase power mains.

Figure 11A:
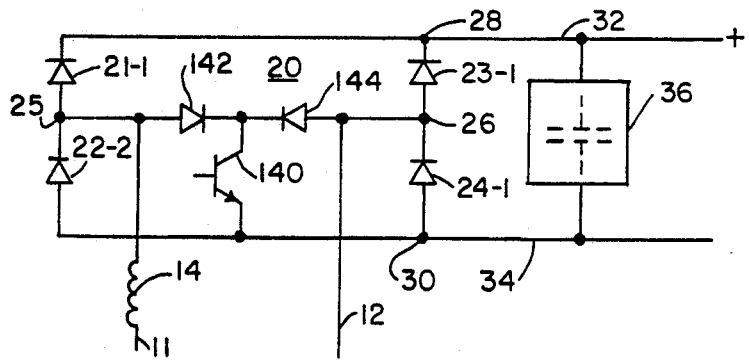
FIGS. 11A through 11D show various arrangements for the configuration component of the controller of the present invention.

FIGS. 11A through 11D show various arrangements for configuration 20 controller 1. For example, as shown in FIG. 11A, a single switch 140 may be used in conjunction with a pair of diodes 142, 144 in configuration 20. Specifically, one terminal of switch 140 is connected to a DC terminal, such as terminal 30. The other terminal of switch 140 is connected in series with each of two diodes 142 and 144 to AC terminals 25 and 26, respectively. The embodiment of controller 1 shown in FIG. 11A operates only in a non-regenerative manner. If desired, switch 140 can be connected to DC terminal 28.

Figure 11B:
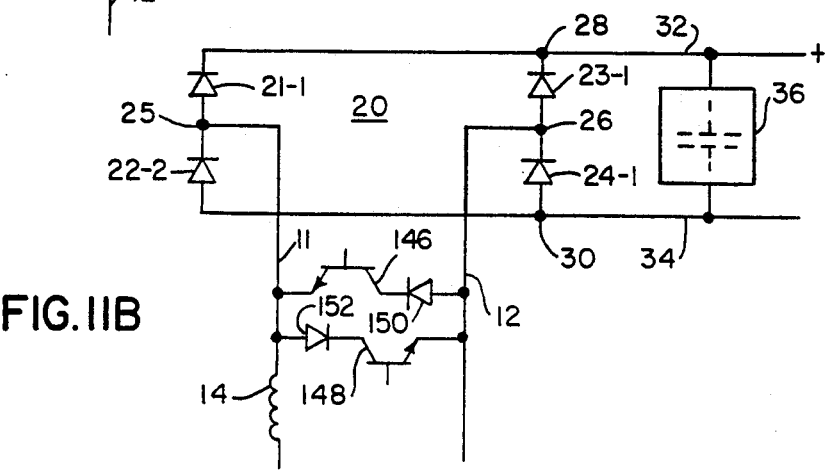

Or, as shown in FIG. 11B, a pair of oppositely poled transistors 146, 148, each in series with a diode 150, 152, respectively, can be connected across AC terminals 25 and 26 or AC conductors 11 and 12 to provide the necessary current paths for two quadrants of operation for controller 1.

Figure 11C:
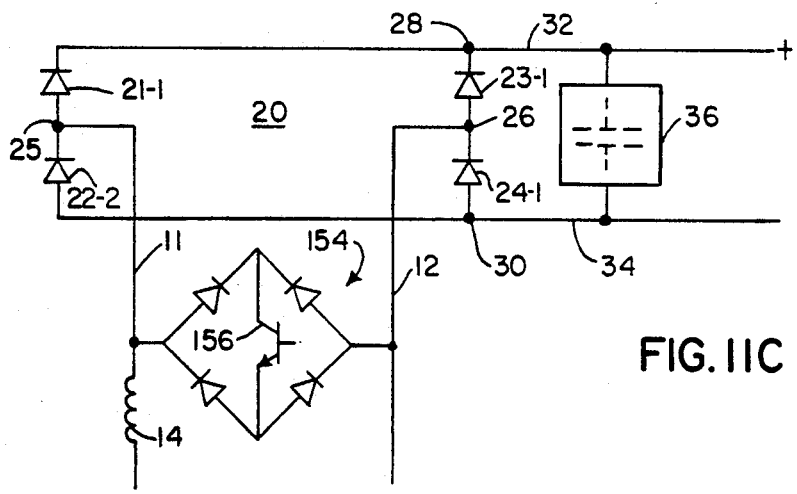

The circuit shown in FIG. 11C may be employed to provide the necessary current paths in controller 1. AC terminals 25 and 26 or AC conductors 11 and 12 are connected to one set of terminals of a rectifier bridge 154 and switch 156 is connected to the other set of terminals.

Figure 11D:
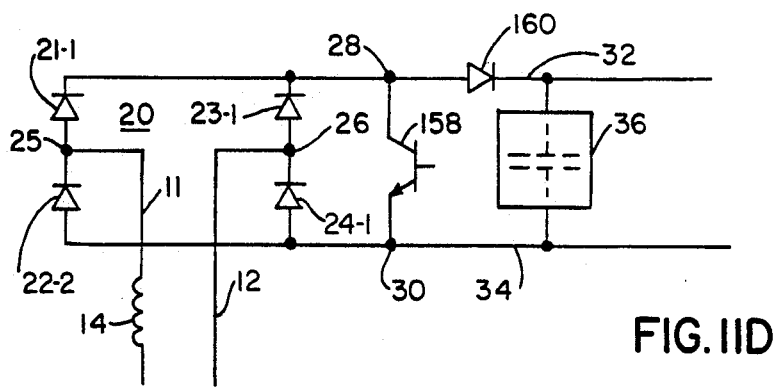

As shown in FIG. 11D, a single switch 158 may be placed between DC terminals 28 and 30 to establish a current path outside configuration 20. A diode 160 is placed between switch 158 and DC element 36 to prevent the switch from short circuiting element 36. The embodiment of controller 1 shown in FIG. 11D operates only in a non-regenerative manner.

In each of the embodiments shown in FIGS. 11A, B, C and D, inductor 14 is in the AC portion 2 of controller 1 as is essential to the operation or the controller.

With respect to the devices comprising diodes 21-1, 22-1, 23-1 and 24-1 and switches 21-2, 22-2, 23-2, and 24-2, it will be appreciated that various types of electrical components can be used for these elements. The switches have been shown as transistors in the figures. These elements may comprise conventional power transistors, field effect transistors (FET); metal oxide, field effect transistors (MOSFET); insulated gate, bipolar transistors (IGBT); and other suitable types of electronic switches. Or, force commutated thyristors or thyristors of the gate turn-off type may be employed. Also, while the switches and diodes have been shown as separate elements in the figures, it will be appreciated that in many types of components, such as MOSFET components, the diode and switch will be combined in a single element.

Figure 18:
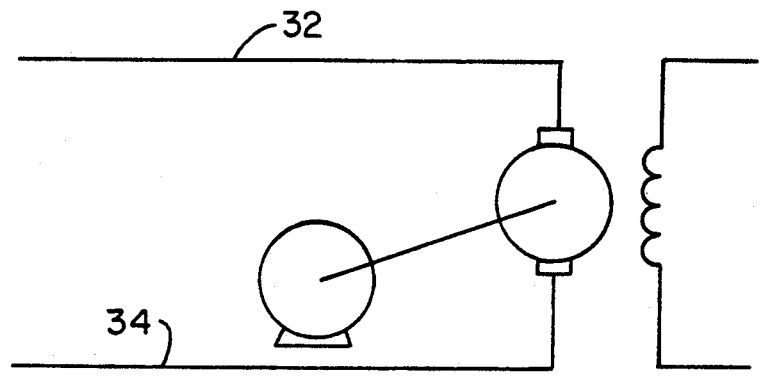
FIG. 18 is a schematic diagram showing a direct current element comprising a rotating machine.

With respect to DC element 36, while this element has been shown as a capacitor in FIG. 1, and elsewhere, it may comprise other electrical devices for which it is desired to take power from the AC mains or supply power to the AC mains. For example, element 36 may comprise a rotating DC machine, as shown in FIG. 18. In such a device, the energy necessary for the operation of controller 1 is stored in the mechanical inertia of the rotating mass of the machine. The machine may be powered from controller 1 or independently by a prime mover. Or, element 36 may comprise a battery. The battery may be charged from controller 1 or from a separate recharger. Element 36 may further comprise an alternator with a rectified output or photovoltaic cell or cells so that by operation of controller 1 in quadrants II and IV it is possible to supply geophysical energy, such as wind or solar energy, to an AC power grid.

Figure 12:
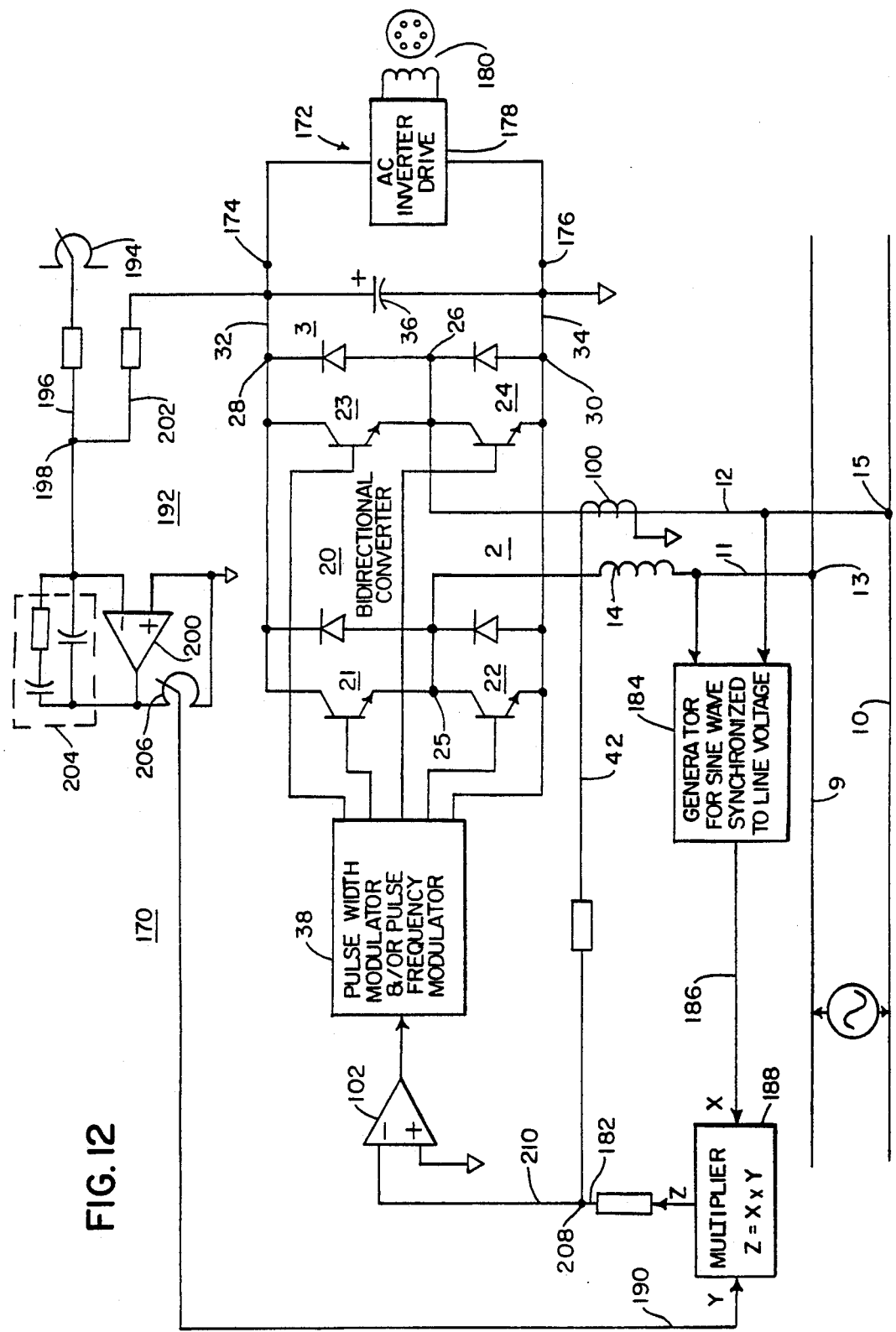
FIG. 12 shows use of the controller of the present invention as a bidirectional power supply.

Several applications of the above described controller 1 will now be described. FIG. 12 shows use of the controller 170 of the present invention in transferring power between AC power mains 9 and 10 and an element 172 connected to output terminals 174 and 176 of the controller and nominally termed a "load". For example, controller 170 may be used as a power supply for a load, such as an AC inverter 178 operating an AC motor 180. As such, controller 170 replaces the previously used rectifier fed-capacitor input filter power supply that produces distortion in the current of the AC power mains. Also, such a conventional rectifier fed-capacitor power supply is not capable of returning or regenerating power back to the AC mains when AC motor 180 connected to AC inverter 178 becomes driven by its mechanical load so as to generate power instead of consuming it. Under such conditions, the power generated by AC motor 180 tends to cause the voltage of the capacitor in the power supply to increase. Prior art power supplies have dissipated this power in a resistor than returning it to the AC power mains. Controller 170 is capable of returning this generated power to the mains.

In FIG. 12, the AC line power from AC power mains 9 and 10 is provided to converter 170 via AC conductors 11 and 12. Inductor 14 is connected in AC conductor 11, and is thus in the AC portion 2 of controller 170. Configuration 20 interposed between AC portion 2 and DC portion 3 comprises four diode-switch current path means 21, 22, 23, and 24. DC portion 3 includes a DC element such as capacitor 36 connected across DC buses 32 and 34 containing output terminals 174 and 176. Capacitor 36 has the capability of receiving or supplying current required in the conversion process while maintaining a voltage greater in magnitude than that of AC power mains 9 and 10.

Control over the switches in current path means 21-24 is accomplished by modulator 38, which may be of the pulse width or other type, driven by amplifier 102, which provides modulator 38 with an input signal that forces the AC current, as measured by current sensor 100, to be equal to a reference current signal in conductor 182.

As described above, controller 170, operating in one of four available quadrants, can establish any magnitude or direction of current in its AC portion 2 as defined by the current reference signal in conductor 182.

Controller 170 shown in FIG. 12 establishes a current in AC conductors 11 and 12 that is sinusoidal in wave shape and in phase with the voltage in AC mains 9 and 10. When this is accomplished, the load which is seen by AC mains 9 and 10 is at unity power factor, and the rms value of the AC line current is the lowest magnitude capable of supplying the required power to AC inverter 178.

In order for the controller 170 to establish a sinusoidal AC line current, a sinusoidal reference signal must be provided for the operation of regulating amplifier 102 and pulse width modulator 38. In addition to being sinusoidal, this reference signal must be in phase with the AC line voltage waveform, and must have a magnitude whose average value corresponds to the average current required by the load 172.

To the foregoing ends, sine wave generator 184 generates a sine wave that is synchronized to the sinusoidal AC line voltage in AC mains 9 and 10 and has the same period and phase as the AC line voltage. Sine wave generator 184 may comprise a simple line voltage attenuator. However, harmonic or other deviations in the AC voltage in AC power mains 9 and 10 will be reflected in the sine wave signal provided by a line voltage attenuator. To avoid this problem, it is preferred that the sine wave be generated independently of the line voltage, yet still be synchronized with line voltage, as for example by use of a phase-locked loop oscillator. A phase locked loop oscillator can produce any desired wave form, including sinusoidal. The operation of the oscillator forces the frequency and phase angle of the output signal to be "locked" or synchronized to an input signal, in this case the AC line voltage.

The magnitude of the sine wave signal in conductor 186 from sine wave generator 184, as determined by a typical AC signal attribute, such as the peak value or rms value, is constant.

So that the signal in conductor 182 can be used as a variable magnitude reference signal for pulse width modulator 38 for determining the proper magnitude of the AC current, a means must be provided for operating on the constant magnitude sine wave signal in conductor 186 to produce the desired, variable magnitude sine wave current reference signal in conductor 182. Multiplier 188 is used for this purpose. The signal in conductor 186 is one input to multiplier 188. The output of multiplier 188 is the algebraic product of two inputs to the multiplier. A second input to multiplier 188 is provided by conductor 190. The signal in conductor 190 is derived from regulator 192, which acts to keep the voltage across capacitor 36 at a constant magnitude for reasons hereinafter described. The output of multiplier 188 is the desired, variable magnitude line current reference signal in conductor 182.

Regulator 192 receives a reference signal proportional to the desired capacitor voltage from potentiometer 194, via conductor 196 connected to summing junction 198 of operational amplifier 200. A feedback voltage corresponding to the actual voltage existing on capacitor 36 is provided via conductor 202, also connected to summing junction 198. The output signal of summing junction 198 is proportional to the error between the desired and actual voltage across capacitor 36. This signal is provided to operational amplifier 200, which has a compensation and stability network 204 connected in its feedback path and signal limit potentiometer 206 in its output. The amplified error signal is provided through potentiometer 206 to conductor 190, as the second input to multiplier 188.

The signal in conductor 190 is essentially a DC level, when compared to the line frequency, since an AC component in this voltage would cause the output of multiplier 188 to deviate from the desired sine wave purity which characterizes the input signal in conductor 186. AC components may be eliminated from the signal in conductor 190 by network 204.

The operation of controller 170 is as follows. If the actual voltage across capacitor 36 is equal to the desired magnitude, the error signal to amplifier 200 and the amplified error signal in conductor 190 are both zero. This represents a "no load" condition in which load 172 does not require any current. Multiplier 188 multiplies the constant magnitude sine wave signal in conductor 186 by the zero signal at conductor 190, and the output of the multiplier in conductor 182 is zero. The current reference signal to current regulator 102 is thus zero. Pulse width modulator 38 does not operate the switches in configuration 20 and the controller 170 does not produce any current in its AC portion, or in its DC portion.

If the operating conditions in the load are such that load 172 now takes current, this current will be supplied from capacitor 36. The voltage of capacitor 36 will tend to drop in magnitude, thereby causing an error signal at junction 198, and an amplified error signal in conductor 190. Multiplier 188 multiplies the constant magnitude sine wave signal in conductor 186 by the amplified error signal in conductor 190. This results in a sine wave signal at the multiplier output in conductor 182. This signal is the reference signal which drives pulse width modulator 138 and causes controller 170 to establish a sinusoidal current in AC line conductors 10 and 12.

Current sensor 100 provides a feedback signal in conductor 42. The reference signal in conductor 182 and the feedback signal in conductor 42 are provided to summing junction 208. The difference signal output from summing junction 208 is provided to amplifier 102 in conductor 210 to drive pulse width modulator 38 and operate configuration 20.

The current in AC line conductors 11 and 12 flows through controller 170 to capacitor 36 to restore its voltage to the original value. Equilibrium occurs when the output of regulator 192 reaches a value that results in multiplier 188 producing a signal in conductor 182 that causes the average magnitude of the sinusoidal AC line current to be equal to the average DC current required by load 172. Under this condition, controller 170 operates in quadrants I and III to provide power from AC lines 9 and 10 to load 172.

If, on the other hand, the AC inverter drive 178 becomes a "source" rather than a load because AC motor 180 is being mechanically driven, the voltage at capacitor 36 will tend to rise because of the current being fed to it by element 172. The amplified error signal in conductor 190 now reverses polarity. The sine wave multiplier output signal in conductor 182 also reverses polarity.

The signal in conductor 182 is still sinusoidal in shape, and still synchronized to the AC line voltage, but it is now 180 electrical degrees out of phase with the line voltage. This causes controller 170 to establish an AC current that is opposite in flow direction from that occurring when element 172 was acting as a load. Controller 170 is now operating in quadrants II and IV, and power is supplied to AC power mains 9 and 10 from element 36. The current wave form is synchronized to the AC line voltage wave form so that controller 170 regenerates power from motor 180 at unity power factor.

If it is not required to provide regenerative operation, as for example when the controller is used as a power supply for a computer, the controller need not operate in all four quadrants. The construction of the controller can be simplified by the elimination of the switches in two of the current paths, as shown in controller 170A of FIG. 13. Such a power supply operates only in quadrants I and III.

Figure 19:
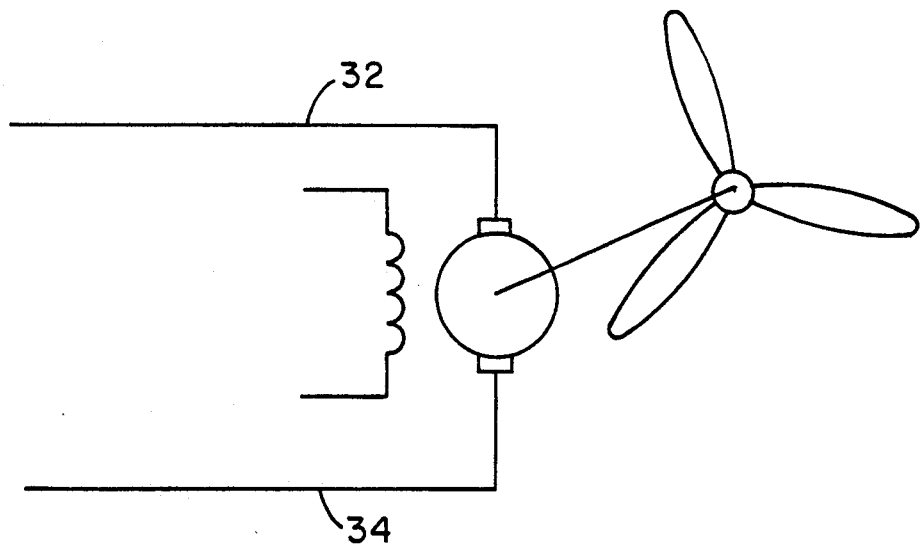
FIG. 19 shows a geophysically powered electrical source connected to the controller of the present invention.

Also, while controller 1 has heretofore been described as connected to AC power mains energized by a conventional AC power grid, it will be appreciated that other means, such as a synchronous AC machine or resonant tank circuit could be used to establish the AC voltage at terminals 13 and 15 used in the operation of controller 1. Thus, use of a resonant tank circuit could enable "stand alone" operation of controller 1 from a geophysical power source, for example photovoltaic cells (see FIG. 19) or a wind driven generator, at a location remote from AC power lines.

Figure 14:
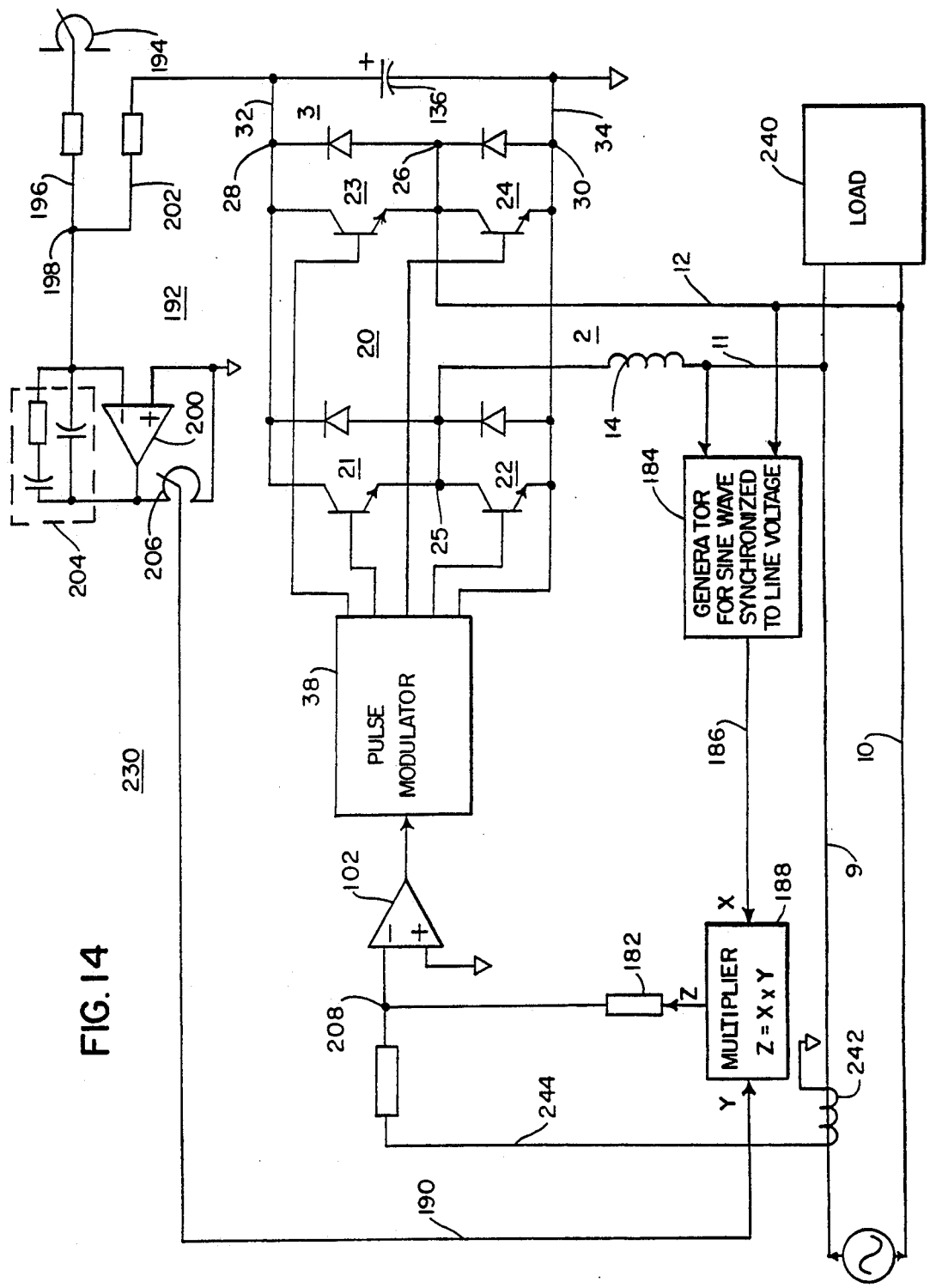
FIG. 14 shows use of the controller of the present invention for correcting or compensating the AC current in AC power mains for distortions produced by one or more loads connected to the power mains.

FIG. 14 shows another application of the controller of the present invention. Controller 230 is used to correct or compensate for distortions in the waveform of the AC line current in the AC power mains produced by the operation of one or more AC loads connected to the AC power mains. As a result of this purpose, the DC portion of controller 230 is not connected to a DC load such as element 172 in FIG. 12. Rather, controller 230 provides or removes non-sinusoidal and phase shifted components that arise by virtue of the operation of load 240 so that the AC power mains contain only sinusoidal, in-phase AC current.

For example, as noted in the introductory portions of the specification, an induction motor as a load causes the AC line current to lag the AC line voltage, resulting in sinusoidal but low power factor operation. Other loads such as thyristor variable speed motor controls or equipment using rectified DC power supplies with capacitor input filters cause high levels of harmonic distortion in the AC line current due to the operational characteristics of such devices. Load 240 may be of the type that takes power from AC power mains 9 and 10 or delivers power to the mains to be absorbed by the mains.

In FIG. 14, elements similar to those of the embodiments of FIGS. 12 and 13 are identified by the same or similar numbers.

Controller 230 contains DC element 136, shown as a capacitor, with the ability to receive currents from or supply currents to the controller while maintaining a voltage with a magnitude greater than the magnitude of the AC line voltage.

In operation of the circuitry of FIG. 14, current transformer 242 senses the AC line current in power main 9 and provides feedback signal in conductor 244. It is to be noted that AC current feedback in FIG. 14 is derived from the current in AC mains 9 and 10, rather than from the current in AC conductors 10 and 12, as in FIG. 12. This feedback signal is compared, in wave form and magnitude, With the sinusoidal reference signal in conductor 182 derived from the AC line voltage in the manner described above in connection with FIG. 12.

By conventional closed loop regulating action which causes the feedback quantity, i.e. the line current, to become equal to the reference quantity, i.e. the sine wave signal in conductor 182, controller 230 operates to add or subtract such current to or from AC lines 9, 10 that causes the AC line current to assume the desired waveform and magnitude as called for by the signal in conductor 182.

Figure 15:
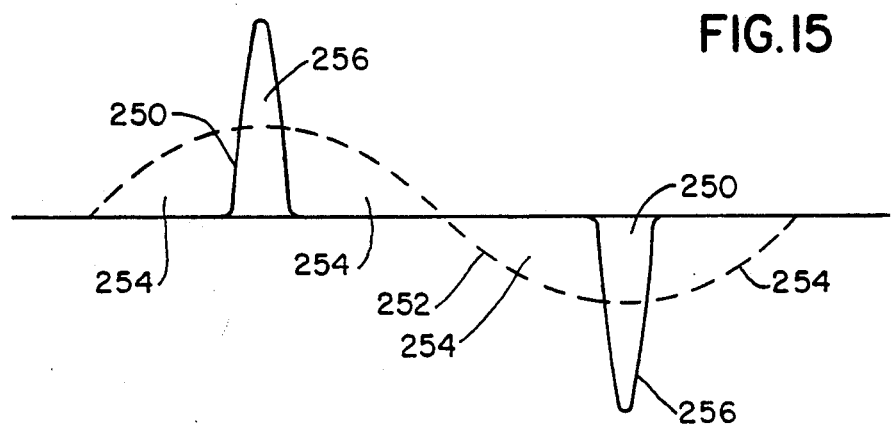
FIG. 15 comprises wave forms showing the operation of the circuitry of FIG. 14.

For example, FIG. 15 shows load current 250 which is typical of the current drawn by a computer having a rectifier fed, capacitor input filter power supply. Current 252 represents the desired sinusoidal AC line current, whose average value is equal to the average value of the distorted current 250. Current 252 also corresponds to the sinusoidal reference signal in conductor 182, described above.

During any portion of the AC cycle, when load 240 does not require as much current as is represented by the sinusoidal reference signal, controller 230 takes current from AC lines 9, 10 which is equal to the difference between the sinusoidal reference current value 252 and the load current, and stores it in the DC element 136 of the controller. These times are shown in FIG. 15 as 254, and during these times, power flows from AC lines 9, 10 to capacitor 136.

In other portions of the AC cycle, when load 240 requires more current than the amount represented by the sinusoidal reference, controller 230 takes current from capacitor 136 which is equal to the amount by which the load current exceeds the current value of the sinusoidal reference signal 252, and delivers this current to AC lines 9, 10 and its connected load 240. This current is shown in FIG. 15 as 256, and during these times power flows from the capacitor 136 to AC lines 9, 10 and its connected load 230. Since the average magnitude of the sinusoidal signal 252 is equal to the average magnitude of the distorted waveform 250, no net transfer of energy to or from element 136 takes place. Rather, element 136 may be considered to absorb the harmonic and reactive volt-ampere component of the load so that the AC line current in power mains 9, 10 is sinusoidal in wave form and in phase with the AC line voltage.

The sinusoidal shaped signal in conductor 182 is established in the same manner as in FIG. 12. The fixed magnitude sine wave signal in conductor 186 is derived from the AC line voltage with a voltage attenuator, a phase-locked loop oscillator, or other appropriate circuitry 184. The magnitude of this sine wave signal is modified by multiplier 188, using the output of capacitor voltage regulator 192 in conductor 190 as the signal which causes multiplier 188 to vary the magnitude of the signal in conductor 186 to produce a line current reference signal.

While the regulator 192 for capacitor voltage in FIG. 14 is structured the same as that of FIG. 12, the purpose of its regulating action is somewhat different. This is because, in FIG. 14, there is no "load" connected to capacitor 136 to influence its voltage and because all currents to and from capacitor 136 arise from the operation of controller 230.

More specifically, voltage regulator 192 in the circuitry of FIG. 14 serves two purposes. First, it maintains the voltage of capacitor 136 at a magnitude which is greater than the magnitude of the AC line voltage, thereby insuring that controller 230 will always have enough voltage available to cause currents to flow from capacitor 136 to the AC line when the proper combination of switches is turned on in configuration 20. This purpose is required even if there is no load 240 connected to the AC mains 9 and 10.

Thus, if the capacitor voltage is too low, amplifier 200 increases its output signal to conductor 190, causing multiplier 188 to produce a sinusoidal line current reference signal in conductor 182 that causes regulating amplifier 102 and pulse width modulator 38 of operate configuration 20 to deliver line current to capacitor 136 to raise its voltage to the desired value. If, on the other hand, the capacitor voltage is too high, amplifier 200 will produce an output signal 190 of opposite polarity, so that multiplier 188 reverses the polarity of the sinusoidal line current reference signal in conductor 182. Pulse width modulator 38 and configuration 20 now deliver current from capacitor 136 to the AC line, thereby reducing the voltage of capacitor 136.

A second function of voltage regulator 192 is to establish the magnitude of the AC line current reference signal in conductor 182 at a level which correctly matches the average value of sinusoidal AC line current to the average value of the load current as required or supplied by load 242.

In connection with this function of regulator 192, it is important to note the following. First, the load current is determined only by the electrical characteristics of load 240 and by the AC line voltage. It is independent of any currents being taken or supplied by converter 230.

Second, the closed loop regulating action of the controller 230 causes controller 230 to add or subtract enough current to the AC line current in the AC power mains 9, 10 to make the feedback signal in conductor 244 equal to the reference signal in conductor 182. Capacitor 136 absorbs or delivers the required currents.

Assume, for example, that following a state of equilibrium in the circuitry shown in FIG. 14, load 240 demands an increased current. The sinusoidal reference signal in conductor 182 now has an average magnitude for the AC line current that is too small to satisfy the current required by the load. The line current momentarily increases to meet the increased current demanded by the load. This causes the current feedback signal in conductor 244 to exceed the reference signal in conductor 182. As a result of the regulating action of regulating amplifier 102, controller 230 supplies current from capacitor 136 to mains 9, 10 and load 240. In so doing, it returns line current to the value established by the reference signal in conductor 182 which is momentarily too small.

The voltage of the capacitor 136 will now start to decrease as the capacitor supplies current to mains 9, 10 and load 240. Voltage regulator 192, responding to an increasing error signal from summing junction 198 increases the output signal in conductor 190. This operates through multiplier 188 to increase the sinusoidal reference signal in conductor 182, and thus the AC line current. Equilibrium is established when reference signal 182 is equal to a value that produces the proper level of sinusoidal AC line current to supply the power required by the load.

Alternately, if the current demanded by the load decreases, the sinusoidal reference signal in conductor 182 is larger than it should be. The regulating action of controller 230 causes the AC line current to be momentarily correspondingly larger than that required by the load. The extra current, not required by the load, is taken from the AC line, passed through configuration 20 and stored in capacitor 136. This increases the capacitor voltage. Voltage regulator 192 responds by decreasing the signal in conductor 190 and thus the sinusoidal reference signal in conductor 182. AC line current is accordingly reduced to a value just large enough to supply load 240.

The peak AC line currents 250 shown in FIG. 15 are typical of those created by a conventional rectifier bridge-capacitor power supply described in the introductory portions of the specification. Through use of controller 230, the existence of such currents in the AC power mains can be avoided. The problems caused by this type of current can also be eliminated since, with the controller of the present invention, the AC line current is sinusoidal and in phase with the AC line voltage. The same is also true of the embodiments shown in FIGS. 12 and 13 in which such a load is connected to the DC terminals of the controller rather than directly to the AC power mains.

Figure 16:
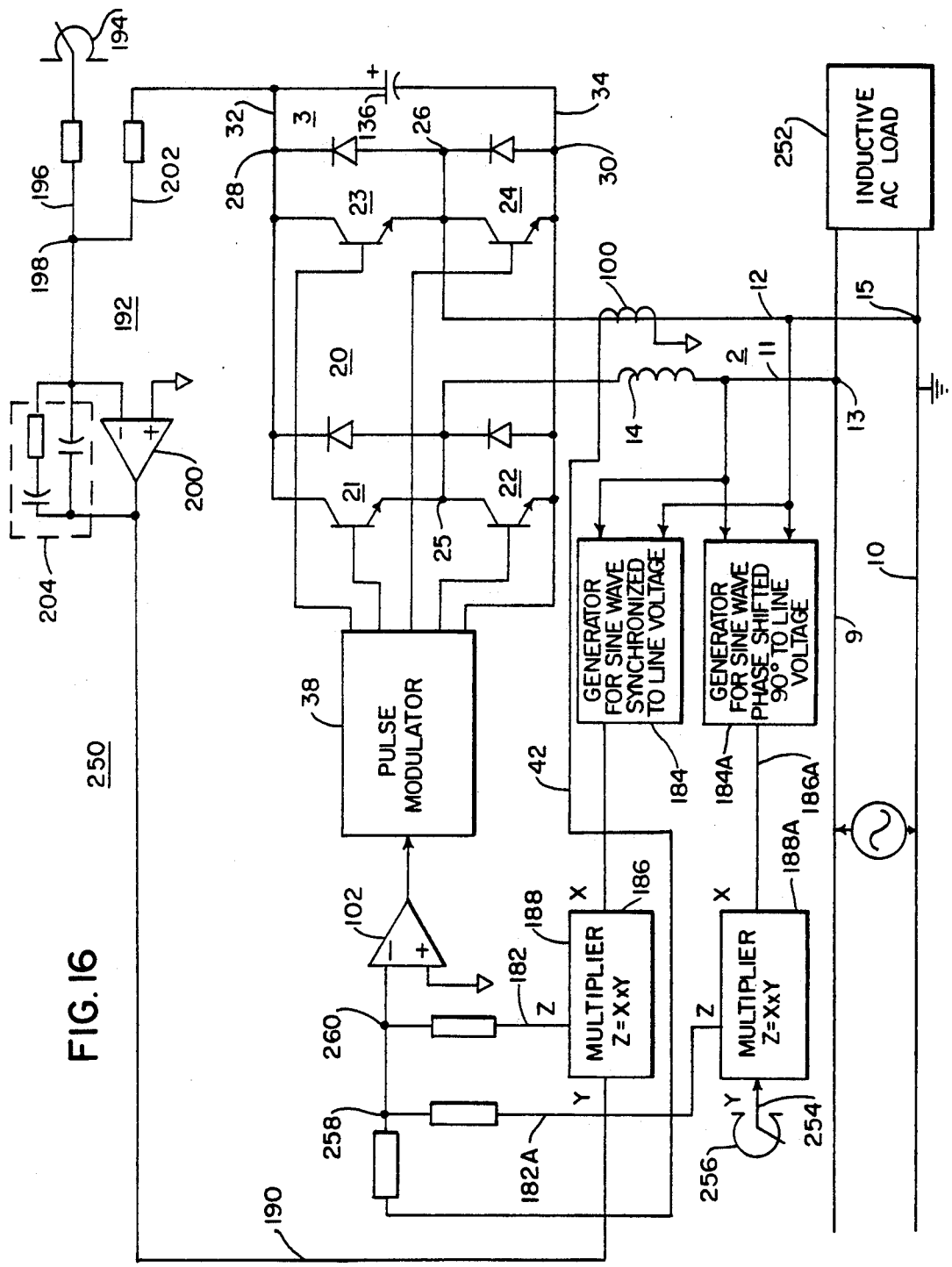
FIG. 16 shows use of the controller of the present invention for providing reactive current to the AC power mains for correcting low power factor due to an inductive load.

FIG. 16 shows a controller 250 of the present invention as used to provide reactive current to AC mains 9, 10, such reactive current being sinusoidal in wave form and leading the AC voltage by 90 electrical degrees. The reactive current may be provided in any desired amount. This leading current represents the same type of current as would be provided by a capacitor placed across the AC line.

As explained previously, leading reactive current of a capacitive nature can be added to the lagging currents caused by an inductive load 252, such as an induction motor, to result in a total AC line current that has no phase shift with relation to the AC voltage. Unity power factor would then be present in AC power mains 9 and 10.

Controller 250 shown in FIG. 16 resembles the controllers shown in both FIG. 12 and FIG. 14 in various respects. As in the circuitry of FIG. 14, no load or source is connected to capacitor 136. As in FIG. 12, current feedback is taken from the AC conductor 12 of controller 250, using current transformer 100 as the sensor, rather than from the AC power mains. As in all the embodiments of the controller of the present invention, inductor 14 is included in the AC portion 2 of the controller in conductor 9, so that the controller can control the magnitude and waveform of current in the inductor, and therefore the current in AC conductors 11 and 12.

To provide reactive current to AC power mains 9 and 10, two components of AC current must flow in AC conductors 11 and 12. First, there is a component of current that is used to maintain the voltage across capacitor 136. This current is necessary to initially bring the capacitor to the voltage greater in magnitude than the magnitude of the AC line voltage so that current can be made to flow from the capacitor 136 to the AC lines at any time during the AC line voltage waveform. This current component also serves to compensate for any drift or transient conditions that might change the voltage on capacitor 136. This component of current is in phase with the AC line voltage, and is nominally zero during steady state operation. It is derived by the controller in response to a sinusoidal reference signal in conductor 182 which is in phase with the AC line voltage.

The second component of AC current carries out the main function of controller 250 and is generated by the converter in response to a phase-shifted sinusoidal reference signal in conductor 186A. In the instance in which controller 250 is being used to compensate for the lagging reactive current of an inductive load 252, sinusoidal reference signal leads the AC line voltage by 90 electrical degrees. Controller 250 responds to this phase shifted sinusoidal reference signal by generating a current which, correspondingly, leads the AC line voltage by 90 electrical degrees. The effect of this current on AC power mains 9 and 10 is identical in nature to the current that would result from a capacitor of equivalent current capacity being connected directly across AC power mains 9 and 10.

In the controller of FIG. 16, sine wave signal generator 184 produces a sine wave signal synchronized to the AC line voltage and in phase with it. This signal is provided in conductor 186 in the same manner as in the circuitries of FIGS. 12, 13, and 14. This signal is one of the inputs to multiplier 188.

Another sine wave signal, produced by sine wave generator 184A is also synchronized to the AC line voltage, but shifted in phase, so that it leads the AC voltage waveform by 90 electrical degrees. This signal is provided in conductor 186A. The signal in conductor 186A is applied to one of the inputs of multiplier 188A. The signals in conductors 186 and 186A are both of constant magnitude, as determined by an appropriate AC signal attribute.

The magnitudes of the respective in-phase and phase shifted outputs of the two multipliers 188 and 188A are independently determined, as follows.

The in-phase component of AC current, proportional to the sinusoidal signal output signal of multiplier 188 in conductor 182, is utilized to establish the voltage across capacitor 136. Its magnitude is determined by the action of voltage regulator 192 in the same manner as in FIG. 14. That is, the reference signal from potentiometer 194 is set to a value corresponding to the desired voltage, and a feedback signal proportional to the voltage of capacitor 136 is obtained in conductor 202. The output signal of regulator 192 in conductor 190 is connected to the second input of multiplier 188, and the multiplying action of multiplier 188 provides a multiplier output signal in conductor 182 comprising an in-phase sinusoidal reference signal of the proper magnitude to keep the capacitor voltage at the desired value. As previously mentioned, under steady state conditions, this signal will be zero, since the leading AC current of the other component of controller AC current has no net power requirement, and will not tend to change the capacitor voltage, once that voltage has been established.

The magnitude of the component of AC line current which is leading the AC line voltage by 90 electrical degrees is determined by the phase-shifted reference signal at the output of multiplier 188A in conductor 182A. The shape and phase relationship of the waveform of the output of multiplier 188A is determined by the phase-shifted sinusoidal input to the multiplier at conductor 186A, while the magnitude of the output of the multiplier is controlled by signal in conductor 254 from signal source 256 applied to the second input of multiplier 188A. Signal source 256 can be manually set to provide a signal corresponding to a desired magnitude of reactive current to be supplied to AC power mains 9 and 10. Or, the signal applied to the second input of multiplier 188A can be derived from a power factor controller coupled to AC power mains 9, 10 that automatically varies the signal in conductor 254 in response to power factor conditions existing in the AC power mains.

The outputs of both multipliers 188 and 188A are supplied, as sinusoidal reference signals, to regulating amplifier 102 and pulse width modulator 38.

The current feedback signal from sensor 100 is provided in conductor 42. The reference signals and feedback signal are algebraically summed at summing junctions 258 and 260 to provide the input signal to regulating amplifier 102. The closed loop regulating action of controller 250 generates current in AC portion 2 of such magnitude phase relationship that the feedback signal in conductor 42 from current sensor 100 is equal to the algebraic sum of the outputs of the two multipliers 188 and 188A. Specifically, there is an in-phase component of current that is proportional to the output of multiplier 188, and a 90 degree leading component of AC current that is proportional to the output of multiplier 188A. The latter component provides the desired level of reactive compensating current to AC power mains 9 and 10.

If it should be desired to generate lagging current in the AC portion of controller 250 rather than the leading current described above, the polarity of the signal in conductor 254 is reversed. This reverses the phase relationship of the output signal of multiplier 188A in conductor 182A. Instead of leading the AC line voltage by 90 electrical degrees this signal now lags the AC line voltage by 90 electrical degrees. The resulting reactive compensating current in the AC portion 2 of controller 250 now correspondingly lags the AC line voltage waveform by 90 electrical degrees.

The use of controller 250 to provide lagging current is advantageous where a fixed capacitor is used to correct for the major amount of leading inductive reactive current, and converter 250 is used to "trim" the total amount of reactive current compensation by adding or subtracting an additional smaller amount of reactive current to compensate for load changes.

Figure 17A:
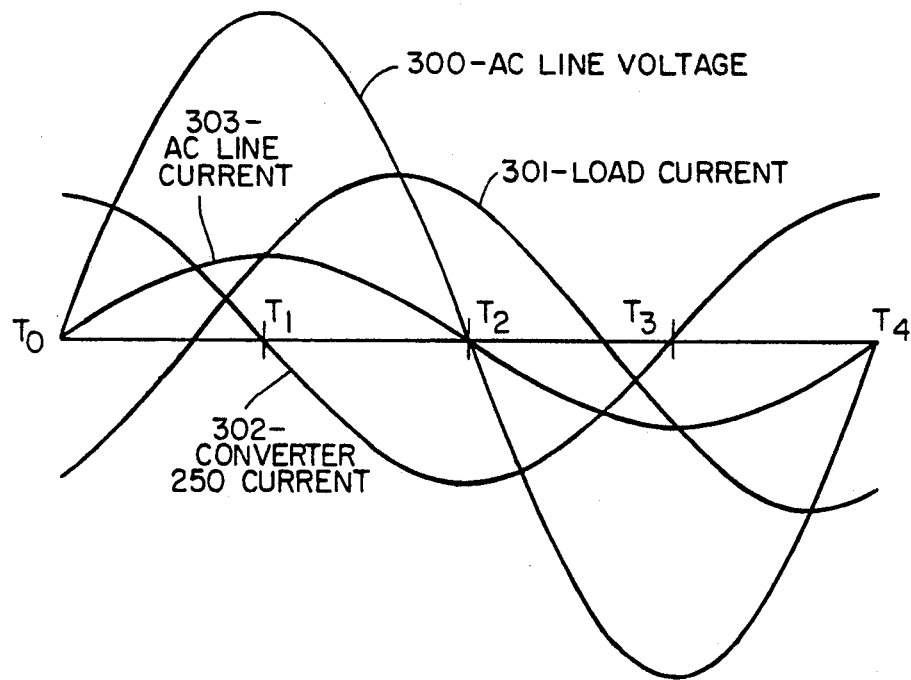
FIG. 17A comprises wave forms showing the operation of the circuitry of FIG. 16.

FIG. 17A shows relationships between the AC line current in power mains 9, 10, the load current, and the current in the AC portion of controller 250, with an inductive load 252 connected to the AC lines. Since the component of the current in controller 250 which is in phase with the AC line voltage, and used to maintain the desired voltage on capacitor 136, is zero in the steady state, it is not shown in FIG. 17.

Waveform 300 is the waveform of the AC line voltage in power mains 9, 10. Waveform 301 shows the load current through load 252, lagging the AC voltage 300. In the example shown in FIG. 17A, the load current 301 lags the line voltage 300 by 60 electrical degrees. Waveform 302 represents the current provided by controller 250 in the AC portion of the controller in AC conductors 11 and 12, with a phase relationship to the AC line voltage 300 that is leading by 90 electrical degrees. Waveform 303 is algebraic sum of the load current 301 and the controller current 302, and hence the total AC current found in AC power mains 9 and 10. In FIG. 17A, the magnitude of waveform 302 has been established by the signal in conductor 254, so that when algebraically added to the load current 301, the resulting current summation 303 is in phase with AC line voltage 300.

An examination of this figure will reveal use of the four quadrants of operation of controller 250 in providing current 302. Between times T0 and T1, the controller takes current from AC power mains 9, 10. Adopting the convention shown in FIGS. 2A and 3A, terminal 13 is subjected to positive AC voltage and current 302 is flowing out of that terminal into controller 250. These conditions characterize quadrant I of controller operation, and controller 250 thus functions in quadrant I. During this time, electrical power is taken from AC power mains 9, 10 and stored in capacitor 136.

From time T1 to time T2, the AC line voltage is still positive at terminal 13, but the controller current now reverses and flows into terminal 13 from controller 250. During this time period, the converter function in quadrant II and power flows from capacitor 136 to line AC power mains 9, 10. It is to be noted that the areas under the curve of controller current 302 from T0 to T1 and under the curve of controller current 302 from T1 to T2 are equal in value but opposite in sign. This means that there is no net average current flow to capacitor 136, and no net change in average capacitor voltage during the half cycle of AC voltage extending from T0 to T2.

From time T2 to T3, current continues to flow into terminal 13 from controller 250 but AC terminal 13 is now subjected to a negative line voltage. The operation of controller 250 is in quadrant III, with power flowing from AC power mains 9, 10 to capacitor 136. Between T3 and T4, the line voltage at terminal 13 remains negative but the direction of flow of current 302 has reversed. This represents operation of controller 250 in quadrant IV, with power flow from capacitor 136 back to AC power mains 9, 10. Again, during the half cycle of AC voltage extending from T2 to T4 there is no net average current flow to capacitor 136, and therefore no net average voltage change on the capacitor.

Figure 17B:
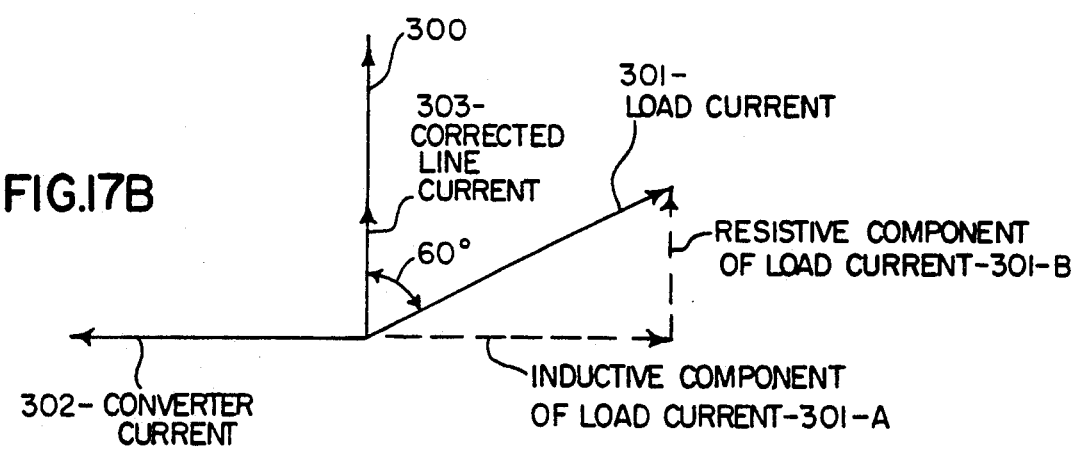
FIG. 17B is an electrical vector diagram of the wave forms of FIG. 17A and further showing the operation of the circuitry of FIG. 16.

The diagram of FIG. 17B shows the relationships of FIG. 17A in conventional vectorial form. The load current 301 is shown lagging AC line voltage 300 by 60 electrical degrees. This load current vector 301 is resolved into a horizontal inductive reactive current component 301-A, and a vertical resistive current component 301-B. The controller current 302 is shown as a horizontal vector leading the AC line voltage 300 by 90 electrical degrees. Its magnitude is equal to that of the inductive reactive current component 301-A of load current vector 301, but in the opposite direction. When controller current 302 is vectorially added to the total load current vector 301, it effectively cancels the inductive reactive current component 301-A. The vectorial sum of load current 301 and controller current 302 is AC power mains current 303, equal in magnitude and phase to the resistive or corrected current component 303 of load current 301. Since the vectorially summed current 303 is in phase with line voltage 300, unity power factor has been achieved in AC power mains 9, 10.

The gist of the power factor correction obtained by the reactive component current provided by controller 250 is to reduce the total AC line current by eliminating from the AC line current the reactive component of current that is otherwise required by a load, such as an induction motor. With the power factor correction shown in FIG. 17B, the rms value of the line current 303 is only half that of the load current 301.

Inasmuch as the purpose of sine wave generator 184 is simply to maintain the voltage on capacitor 136, it will be appreciated that sine wave generator 184 and multiplier 188 can be eliminated if the DC voltage necessary for the operation of controller 250 can be maintained independently of the controller. For example, a battery with a recharger or a DC machine driven by a prime mover could be used for this purpose.

In summary, the present invention provides a switched inductor controller having conductors connected to AC power mains. The inductor is interposed in at least one of the AC conductors. A DC element such as a capacitor, capable of attaining and maintaining a voltage higher than the AC voltage in the AC power mains, is connected across DC buses. A controllable current path configuration is connected between the AC power mains and the DC buses. Operation of the configuration, as by a pulse width modulation control, permits establishment of a desired polarity of voltage on the induct control of the current through the inductor the controller. By appropriate regulatory circuitry coupled to the control, the controller current may be controlled with respect to magnitude, current flow direction, wave shape, frequency, phase relationship to AC line voltage in the power mains, or other properties.

The switched inductor controller of the present invention may be coupled to AC power mains to overcome the adverse effects on the AC line current of phase shifted and harmonic current components produced by loads connected to the AC power mains. In accomplishing such operation, the regulatory circuit of the controller causes the current in the AC power mains or controller to assume the desired properties and the DC element supplies or absorbs the difference between the AC line current and the load current, thereby to maintain the quality of the power in the AC power mains.

Or, loads may be connected directly to the DC portion of the controller, in which case the controller operates such loads without distortion of the AC current, thereby also preserving the quality of the power in the AC mains.

The bidirectional nature of the controller permits power to be regenerated from an electrical element connected to the controller to the AC power mains and at unity power factor.

It is recognized that various further modifications and alterations may be made to the controller described above and it is intended to include within the present invention all such modifications and alterations as come within the scope of the following claims.

I claim:

1. An electrical controller in which a current having desired, arbitrarily selected properties of magnitude, flow direction, and changes of the foregoing with respect to time can be established, said controller being connectable to AC means providing an AC voltage and comprising:

at least a pair of AC conductors in which the current having the desired, arbitrarily selected properties can be established, said AC conductors being connectable to the AC means for being subjected to the AC voltage;

inductive means connected in at least one of said AC conductors and through which said current flows;

DC bus means;

DC means connected across said DC bus means, said DC means being capable of attaining a DC voltage, the magnitude of which is greater than the magnitude of the AC voltage in said AC conductors, said DC means being capable of accepting or supplying currents involved in the operation of the controller from or to said DC bus means without excessive change in the DC voltage;

a configuration having AC terminals connected to said AC conductors and DC terminals connected to said DC bus means, said configuration having a plurality of current path means capable of connecting at least one of said AC terminals to at least one of said DC terminals or said AC terminals to each other, each of said current path means including a current conduction means through which current may flow in the respective current path means, at least one of said current conduction means being controllable for allowing or preventing current flow in the current path means having same;

means for providing a signal corresponding to the current desired in said AC conductors and for which the properties of current magnitude, current flow direction, and changes in the foregoing with respect to time can be arbitrarily selected; and control means coupled to said signal providing means and controlling the controllable current conduction means responsive to said signal for forming current paths in said controller that establish that polarity and magnitude of voltage across said inductive means that cause the current paths in said controller that establish that polarity and magnitude of voltage across said inductive means that cause the current in said inductive means, and hence the current through said AC conductors, to increase, decrease, or maintain its value in a desired manner and that cause either direction of current to flow through said inductive means for either polarity of AC voltage to which said AC conductors are subjected, thereby to permit bidirectional power transfer through said controller to or from the AC means and so that the current in said AC conductors has the desired, arbitrarily selected properties.

2. The controller according to claim 1 wherein said signal providing means is further defined as providing a signal corresponding to a desired current magnitude and flow direction profile for the current and wherein said control means controls the controllable current conduction means for forming current paths in said controller that establish a current having the desired profile.

3. The controller according to claim 2 wherein said signal providing means is further defined as providing signal corresponding to a current with a current magnitude and flow direction profile having a desired relationship to the AC voltage of the AC means.

4. The controller according to claim 2 wherein said signal providing means is further defined as providing a signal corresponding to a current having a time varying current magnitude and flow direction profile.

5. The controller according to claim 4 wherein said signal providing means is further defined as providing a signal corresponding to a current having a sinusoidal current magnitude profile.

6. The controller according to claim 5 wherein said signal providing means is further defined as providing a signal corresponding to a current having a sinusoidal current magnitude profile in phase with the AC voltage of the AC means.

7. The controller according to claim 5 wherein said signal providing means is further defined as providing a current having a sinusoidal current magnitude profile having the same frequency as the AC voltage of the AC means.

8. The controller according to claim 6 wherein said signal providing means is further defined as providing a signal corresponding to a current having a sinusoidal current magnitude profile having the same frequency as the AC voltage of the AC means.

9. The controller according to claims 1, 4, or 8 wherein said controller is further defined as having an electrical load couplable to said DC bus means and wherein said configuration provides a sufficient number of current paths to enable said controller to provide power to the electrical load from the AC means.

10. The controller according to claims 1, 4, or 8 wherein said controller is further defined as having an electrical element capable of functioning as an electrical load or as an electrical source couplable to said DC bus means and wherein said configuration provides a sufficient number of current path means to enable said controller to provide power to the electrical element from the AC means and to pass power from the electrical element to the AC means.

11. The controller according to claims 1, 4, or 8 wherein said controller is further defined as having an electrical source couplable to said DC bus means and wherein said configuration provides a sufficient number of current path means to pass power from the electrical source to the AC means.

12. The controller according to claim 11 further defined as having a geophysically powered electrical source couplable to said DC means.

13. The controller according to claim 1 wherein said controller is further defined as connectable to AC power mains containing the AC voltage.

14. The controller according to claim 1 wherein said control means includes pulse width modulation means.

15. The controller according to claim 1 wherein said control means includes pulse frequency modulation means.

16. The controller according to claim 1 wherein said control means includes means operating with both pulse width and pulse frequency modulating characteristics.

17. The controller according to claim 1 wherein said configuration is further defined as having a plurality of current path means for connecting each of said AC terminals to each of said DC terminals, each of said current path means including a unidirectional current conduction means; and controllable switch means operatively associated with said configuration for providing at least one additional current path in said controller in addition to those established by said unidirectional current conduction means, said control means controlling the conductive state of said controllable switch means.

18. The controller according to claim 17 wherein said controllable switch means is further defined as a controllable unidirectional current flow switch means.

19. The controller according to claim 17 wherein selected current path means in said configuration have controllable unidirectional current flow switch means connected in parallel with said unidirectional current conduction means, the direction of current flow through said controllable unidirectional current flow switch means being opposite to the direction of current flow through the unidirectional current conduction means with which the controllable unidirectional current flow switch means is connected in parallel, said control means controlling the conductive state of said controllable unidirectional current flow switch means.

20. The controller according to claim 1 further including current feedback signal means providing a signal corresponding to the actual current in said AC conductors, said current feedback signal means supplying said actual current signal to said control means in opposition to said desired current signal.

21. The controller according to claim 1 wherein said controller is interposed between AC power mains and an electrical element that can comprise an electrical load or an electrical power source, said controller transferring electrical power in a desired direction between the AC power mains and the electrical element, said controller further comprising:
- DC output terminals in said DC bus means, the electrical element being connectable to said DC output terminals for receiving or supplying a DC current;
- said signal providing means being further defined as means for providing a sine wave signal synchronized to the AC line voltage, the average magnitude of said signal being proportional to the average current received or supplied by the electrical element;
- means providing a current feedback signal proportional to the current flowing in said AC conductors; and
- means providing a difference signal corresponding to the difference between said sine wave signal and said current feedback signal and supplying same to said control means such that the operation of said controller acts to cause the AC conductors to provide or absorb a sinusoidal current in phase with the line voltage, the average magnitude of which is equal to the DC current of the element.

22. The controller according to claim 21 further including a voltage regulator coupled to said DC means and to said sine wave signal providing means for establishing the magnitude of said sine wave signal.

23. The controller according to claim 21, wherein said signal providing means further includes:
- signal means for providing a DC means voltage difference signal corresponding to the difference between a desired voltage of said DC means and the actual voltage of said DC means;
- means providing a further sine wave signal synchronized to the AC line voltage; and
- multiplier means having inputs receiving said DC means voltage difference signal and said further sine wave signal and providing an output signal that is the product of the input signals and comprises said synchronized sine wave signal having the average magnitude proportional to the average current received or supplied by the electrical element; and wherein
- said means providing a difference signal is further defined as means providing a difference signal corresponding to the difference between said multiplier means output signal and said current feedback signal and supplying same to said control means.

24. The controller according to claim 1 wherein said DC means comprises a rotating machine.

25. The controller according to claim 1 wherein said configuration includes a center tapped transformer interposed between the AC means and said configuration.

26. The controller according to claim 13 wherein said controller is further defined as being connectable to single phase AC power mains, wherein said controller has a pair of AC conductors, and wherein said configuration has a pair of AC terminals connected to said AC conductors.

27. The controller according to claim 13 wherein said controller is further defined as connectable to polyphase AC power mains, wherein said controller includes a plurality of AC conductors containing inductive means connectable to the polyphase AC mains, and wherein said configuration includes a plurality of AC terminals, one of which is connected to each of said plurality of AC conductors.

28. The controller according to claim 13 wherein said inductive means is connected in only one of said AC conductors.

29. The controller according to claim 1 wherein said inductive means includes an inductive element connected in more than one of said AC conductors.

30. The controller according to claim 1 wherein said DC means comprises a capacitor.

31. The controller according to claim 1 wherein said DC means comprises a battery.

32. The controller according to claim 1 wherein said controller is interposed between AC power means comprising AC power mains providing an AC line voltage and an electrical load, said controller further comprising:
- DC output terminals in said DC bus means, the electrical load being connectable to said DC output terminals for receiving a DC current;
- said signal providing means being further defined as means for providing a sine wave signal synchronized to the AC line voltage, the average magnitude of said signal being proportional to the average current supplied to the electrical load;
- means for providing a feedback signal proportional to the current flowing in said AC conductors; and
- means providing a difference signal corresponding to the difference between said sine wave signal and said current feedback signal and supplying same to said control means such that the operation of said controller acts to cause the AC conductors to provide a sinusoidal current in phase with the line voltage, the average magnitude of which is equal to the DC current of the electrical load.

33. The controller according to claim 32 wherein said signal providing means further includes:
- signal means for providing a DC means voltage difference signal corresponding to the difference between a desired voltage of said DC means and the actual voltage of said DC means;
- means providing a sine wave signal synchronized to the AC line voltage; and
- multiplier means having inputs receiving said DC means voltage difference signal and said sine wave signal and providing an output signal that is the product of the input signals and comprises said synchronized sine wave signal the average magnitude of which is proportional to the average current supplied to the electrical load; and wherein said means providing a difference signal is further defined as means providing a difference signal corresponding to the difference between said multiplier means output signal and said current feedback signal and supplying same to said control means.

34. The controller according to claim 32 further including a voltage regulator coupled to said DC means and said sine wave signal providing means for establishing the magnitude of said sine wave signal.

35. A controller connectable to AC power mains containing an AC line voltage, said controller introducing a desired reactive current component in said AC mains, said reactive current component being phase shifted 90 electrical degrees in a desired direction with respect to the AC line voltage, said controller comprising:

at least a pair of AC conductors in which current of desired magnitude and flow direction can be established, said AC conductors being connectable to the AC mains for being subjected to the AC line voltage;

an inductive means connected in at least one of said AC conductors and through which said current flows;

DC bus means;

DC means connected across said DC bus means, said DC means being capable of attaining a DC voltage, the magnitude of which is greater than the magnitude of the AC voltage in said AC conductors, said DC means being capable of accepting or supplying currents involved in the operation of the controller from or to said DC bus means without excessive change in the DC voltage;

a configuration having AC terminals connected to said AC conductors and DC terminals connected to said DC bus means, said configuration having a plurality of current path means capable of connecting at least one of said AC terminals to at least one of said DC terminals or said AC terminals to each other, each of said current path mean including a current conduction means through which current may flow in said current path means, at least one of said current conduction means being controllable for allowing or preventing current flow in said current path means; and control means for controlling the controllable current conduction means for forming current paths in said controller that establish that polarity and magnitude of voltage across said inductive means that cause the current in the inductive means to increase, decrease, maintain its value, or reverse flow direction in a desired manner, so as to control the magnitude and flow direction of the current through the inductive means and hence the AC conductors, said control means including:

first signal means for forming a first sine wave signal synchronized to the AC line voltage, the average magnitude of said first sine wave signal being sufficient to maintain the voltage on said DC means:

said signal means for forming a second sine wave signal phase shifted 90 electrical degrees with respect to the AC line voltage in the direction of the phase shift of the reactive component desired to be introduced by said controller, the magnitude of said second sine wave signal being such as to provide the desired magnitude of the reactive current component;

means for providing a current feedback signal proportional to the current flowing in said AC conductors; and means for providing a difference signal corresponding to the difference between the algebraic sum of said first and second sine wave signals and said current feedback signal and being employed by said control means such that the operation of the controller acts to establish a current in the AC conductors that introduces the desired reactive current component in said AC mains.

36. The controller according to claim 35 further including a voltage regulator coupled to said DC means and to said first means for establishing the magnitude of said first sine wave signal.

37. The controller according to claim 35 wherein said controller further comprises:

further signal means for providing a DC means voltage difference signal corresponding to the difference between a desired voltage of said DC means and the actual voltage of said DC means;

and wherein said first signal means comprises;

means providing a third sine wave signal synchronized to the AC line voltage; and multiplier means having inputs receiving said DC means voltage difference signal and said third sine wave signal and providing the first sine wave signal that is the product of the input signals.

38. The controller according to claim 35 wherein said second sine wave signal means comprises:

means providing a further sine wave signal phase shifted 90 electrical degrees with respect to the AC line voltage in the desired direction of the phase shift of introduced reactive current component;

means providing a signal corresponding to the desired amount of introduced reactive current component; and multiplier means having inputs receiving said desired amount signal and said phase shifted further sine wave signal and providing the second sine wave signal that is the product of the input signals.

39. A control connectable to AC power mains containing an AC line voltage and coupled to an electrical load or source element capable of distorting the properties of the AC current appearing in the power mains such that the AC current in the element comprises a sinusoidal component and a component representing distortion, said controller comprising:

at least a pair of AC conductors in which current of desired magnitude and flow direction can be established, said AC conductors being connectable to the AC mains for being subjected to the AC line voltage;

an inductive means connected in at least one of said AC conductors and through which said current flows;

DC bus means, the electrical element being couplable to said DC bus means;

DC means connected across said DC bus means, said DC means being capable of attaining a DC voltage, the magnitude of which is greater than the magnitude of the AC voltage in said AC conductors, said DC means being capable of accepting or supplying currents involved in the operation of the controller from or to said DC bus means without excessive change in the DC voltage;

a configuration having AC terminals connected to said AC conductors and DC terminals connected to said DC bus means, said configuration having a plurality of current path means capable of connecting at least one of said AC terminals to at least one of said DC terminals or said AC terminals to each other, each of said current path means including a current conduction means through which current may flow in said current path means, at least one of said current conduction means being controllable for allowing or preventing current flow in said current path means; and control means for controlling the controllable current conduction means for forming current paths in said controller that establish that polarity and magnitude of voltage across said inductive means that cause the current in the inductive means to increase, decrease, maintain its value, or reverse flow direction in a desired manner, so as to control the magnitude and flow direction of the current through the inductive means and hence the AC conductors, said control means including;

means for forming a sine wave signal synchronized to the AC line voltage, the magnitude of which is proportional to the sinusoidal component;

means providing a current feedback signal proportional to the current flowing in AC power mains; and means providing a difference signal corresponding to the difference between said sine wave signal and said current feedback signal, said difference representing the current distortion component and being employed by said control means such that the operation of the controller acts to supply the distorted current component of the element current, thereby establishing sinusoidal current in the AC power mains.

40. The controller according to claim 39 further including a voltage regulator coupled to said DC means and to said sine wave signal forming means for establishing the magnitude of said sine wave signal.

41. The controller according to claim 39 wherein said controller further comprises:

signal means for providing a DC means voltage difference signal corresponding to the difference between a desired voltage of said DC means and the actual voltage of said DC means;

means providing a further sine wave signal synchronized to the AC line voltage;

multiplier means having inputs receiving said DC means voltage difference signal and said further sine wave signal and providing and output signal that is the product of the input signals and comprises said synchronized sine wave signal the magnitude of which is proportional to the sinusoidal component; and wherein said means providing a difference signal is further defined as means for providing a difference signal corresponding to the difference between said multiplier means output signal and said current feedback signal for use by said control means.

42. A controller connectable to AC power mains containing an AC line voltage and wherein said AC power mains are coupled to an electrical load or source element which introduces a reactive current component in said AC mains, said reactive current component being phase shifted 90 electrical degrees in a given direction with respect to the AC line voltage, said controller being defined as compensating for the reactive current component in the AC power mains, said controller comprising:

at least a pair of AC conductors in which current of desired magnitude and flow direction can be established, said AC conductors being connectable to the AC mains for being subjected to the AC line voltage;

an inductive means connected in at least one of said AC conductors and through which said current flows;

DC bus means;

DC means connected across said DC bus means, said DC means being capable of attaining a DC voltage, the magnitude of which is greater than the magnitude of the AC voltage in said AC conductors, said DC means being capable of accepting or supplying currents involved in the operation of the controller from or to said DC bus means without excessive change in the DC voltage;

a configuration having AC terminals connected to said AC conductors and DC terminals connected to said DC bus means, said configuration having a plurality of current path means capable of connecting at least one of said AC terminals to at least one of said DC terminals or said AC terminals to each other, each of said current path mean including a current conduction means through which current may flow in said current path means, at least one of said current conduction means being controllable for allowing or preventing current flow in said current path means; and control means for controlling the controllable current conduction means for forming current paths in said controller that establish that polarity and magnitude of voltage across said inductive means that cause the current in the inductive means to increase, decrease, maintain its value, or reverse flow direction in a desired manner, so as to control the magnitude and flow direction of the current through the inductive means and hence the AC conductors, said control means including:

first signal means for forming a first sine wave signal synchronized to the AC line voltage, the average magnitude of said first sine wave signal being sufficient to maintain the voltage on said DC means:

second signal means for forming a second sine wave signal phase shifted 90 electrical degrees with respect to the AC line voltage in the opposite direction from the phase shift of the reactive component produced by the element, the magnitude of said second sine wave signal being such as to provide the desired extent of correction to the reactive current component;

means for providing a current feedback signal proportional to the current flowing in said AC conductors; and means for providing a difference signal corresponding to the difference between the algebraic sum of said first and second sine wave signals and said current feedback signal and being employed by said control means such that the operation of the controller acts to establish a current in the AC conductors that is phase shifted 90 electrical degrees with respect to the AC line voltage in a direction opposite to the reactive current component to subtract from the reactive current component in the AC mains and reduce the net reactive current component of the current in the AC mains.

43. The controller according to claim 42 further including a voltage regulator coupled to said DC means and to said first means for establishing the magnitude of said first sine wave signal.

44. The controller according to claim 42 wherein said controller further comprises:
   further signal means for providing a DC means voltage difference signal corresponding to the difference between a desired voltage of said DC means and the actual voltage of said DC means;
   and wherein said first signal means comprises;
   means providing a third sine wave signal synchronized to the AC line voltage; and
   multiplier means having inputs receiving said DC means voltage difference signal and said third sine wave signal and providing the first sine wave signal that is the product of the input signals.

45. The controller according to claim 42 wherein said second sine wave signal means comprises:
   means providing a further sine wave signal phase shifted 90 electrical degrees with respect to the AC line voltage in the opposite direction from the phase shift of the reactive component produced by the element;
   means providing a signal corresponding to the desired amount of compensation; and
   multiplier means having inputs receiving said desired compensation amount signal and said phase shifted further sine wave signal and providing the second sine wave signal that is the product of the input signals.

46. The controller according to claim 44 wherein said second sine wave signal means comprises:
   means providing a further sine wave signal phase shifted with respect to the AC line voltage in the opposite direction from the phase shift of the reactive component produced by the element;
   means providing a signal corresponding to the desired amount of compensation; and
   multiplier means having inputs receiving said desired compensation amount signal and said phase shifted further sine wave signal and providing the second sine wave signal that is the product of the input signals.

47. The controller connectable to AC power mains containing an AC line voltage and wherein said AC power mains are coupled to an electrical load or source element which introduces a reactive current component in the AC mains, said reactive current component being phase shifted 90 electrical degrees in a given direction with respect to the AC line voltage, said controller being defined as compensating for the reactive current component in the AC power mains; said controller comprising:
   at least a pair of AC conductors in which current of desired magnitude and flow direction can be established, said AC conductors being connectable to the AC means for being subjected to the AC line voltage;
   an inductive means connected in at least one of said AC conductors and through which said current flows;
   DC bus means;
   DC means connected across said DC bus means, said DC means being capable of attaining a DC voltage independently of said controller, the magnitude of which is greater than the magnitude of the AC voltage in said AC conductors, said DC means being capable of accepting or supplying currents involved in the operation of the controller from or to said DC bus means without excessive change in the DC voltage;
   a configuration having AC terminals connected to said AC conductors and DC terminals connected to said DC bus means, said configuration having a plurality of current path means capable of connecting said at least one of AC terminals to at least one of said DC terminals or said AC terminals to each other, each of said current path means including a current conduction means through which current may flow in said current path means, at least one of said current conduction means being controllable for allowing or preventing current flow in said current path means;
   control means for controlling the controllable current conduction means for forming current paths in said controller that establish that polarity and magnitude of voltage across said inductive means that cause the current in the inductive means to increase, decrease, maintain its value, or reverse flow direction in a desired manner, so as to control the magnitude and flow direction of the current through the inductive means and hence the AC conductors, said control means including:
   signal means for forming a sine wave signal phase shifted 90 electrical degrees with respect to the AC line voltage in the opposite direction from the phase shift of the reactive component produced by the element, the magnitude of said sine wave signal being such as to provide the desired extent of compensation to the reactive current component;
   means for providing a current feedback signal proportional to the current flowing in said AC conductors; and
   means for providing a difference signal corresponding to the difference between the sine wave signal and said current feedback signal and being employed by said control means such that the operation of the controller acts to establish a current in the AC conductors that is phase shifted 90 electrical degrees with respect to the AC line voltage in a direction opposite to the reactive current component to subtract from the reactive current component in the AC mains and reduce the net reactive current component of the current in the AC mains.

48. The controller according to claim 47 wherein said sine wave signal forming means comprises:
   means providing a further sine wave signal phase shifted 90 electrical degrees with respect to the AC line voltage in the opposite direction from the phase shift of the reactive component produced by the element;
   means providing a signal corresponding to the desired amount of compensation; and
   multiplier means having inputs receiving said desired compensation amount signal and said phase shifted further sine wave signal and providing the sine wave signal providing the desired extent of compensation that is the product of the input signals.

49. A controller connectable to AC power mains containing an AC line voltage, said controller introducing a desired reactive current component in said AC mains, said reactive current component being phase shifted 90 electrical degrees in a desired direction with respect to the AC line voltage, said controller comprising:

at least a pair of AC conductors in which current of desired magnitude and flow direction can be established, said AC conductors being connectable to the AC mains for being subjected to the AC line voltage;

an inductive means connected in at least one of said AC conductors and through which said current flows;

DC bus means;

DC means connected across said DC bus means, said DC means being capable of attaining a DC voltage independently of said controller, the magnitude of which is greater than the magnitude of the AC voltage in said AC conductors, said DC means being capable of accepting or supplying currents involved in the operation of the controller from or to said DC bus means without excessive change in the DC voltage;

a configuration having AC terminals connected to said AC conductors and DC terminals connected to said DC bus means, said configuration having a plurality of current path means capable of connecting at least one of said AC terminals to at least one of said DC terminals or said AC terminals to each other, each of said current path mean including a current conduction means through which current may flow in said current path means, at least one of said current conduction means being controllable for allowing or preventing current flow in said current path means; and control means for controlling the controllable current conduction means for forming current paths in said controller that establish that polarity and magnitude of voltage across said inductive means that cause the current in the inductive means to increase, decrease, maintain its value, or reverse flow direction in a desired manner, so as to control the magnitude and flow direction of the current through the inductive means and hence the AC conductors, said control means including:

signal means for forming a sine wave signal phase shifted 90 electrical degrees with respect to the AC line voltage in the direction of the phase shift of the reactive component desired to be introduced by said controller, the magnitude of said sine wave signal being such as to provide the desired magnitude of the reactive current component;

means for providing a current feedback signal proportional to the current flowing in said AC conductors; and means for providing a difference signal corresponding to the difference between the sine wave signal and said current feedback signal and being employed by said control means such that the operation of the controller acts to establish a current in the AC conductors that introduces the desired reactive current component in the AC mains.

50. The controller according to claim 49 wherein said sine wave signal forming means comprises:

means providing a further sine wave signal phase shifted 90 electrical degrees with respect to the AC line voltage in the direction of the phase shift of the reactive component desired to be introduced by said controller;

means providing a signal corresponding to the desired amount of introduced reactive current component; and multiplier means having inputs receiving said desired amount signal and said phase shifted further sine wave signal and providing the sine wave signal providing the desired magnitude of reactive current component that is the product of the input signals.

* * * * *

UNITED STATES PATENT AND TRADEMARK OFFICE
CERTIFICATE OF CORRECTION

PATENT NO. : 5,283,726
DATED : February 1, 1994
INVENTOR(S) : Wilkerson

It is certified that error appears in the above-indentified patent and that said Letters Patent is hereby corrected as shown below:

CLAIM 1, Col. 31, lines 37-40, after "current" delete "paths in said controller that establish that polarity and magnitude of voltage across said inductive means that cause the current"; CLAIM 12, Col. 32, line 41, after "DC" insert ---bus---; CLAIM 35, Col. 35, line 61, delete "said" and substitute therefor ---second---; CLAIM 39, Col. 36, line 42, delete "control" and substitute therefor ---controller---; CLAIM 41, Col. 37, line 51, delete "and" and substitute therefor ---an---

Signed and Sealed this

Nineteenth Day of July, 1994

BRUCE LEHMAN

Attesting Officer    Commissioner of Patents and Trademarks

(12) EX PARTE REEXAMINATION CERTIFICATE (8329th)
United States Patent
Wilkerson

(10) Number: US 5,283,726 C1
(45) Certificate Issued: Jun. 21, 2011

(54) AC LINE CURRENT CONTROLLER UTILIZING LINE CONNECTED INDUCTANCE AND DC VOLTAGE COMPONENT

(75) Inventor: Alan W. Wilkerson, Cedarburg, WI (US)

(73) Assignee: Enpat, Inc., Melbourne, FL (US)

Reexamination Request:
No. 90/009,404, Feb. 9, 2009

Reexamination Certificate for:
Patent No.: 5,283,726
Issued: Feb. 1, 1994
Appl. No.: 07/810,961
Filed: Dec. 20, 1991

Certificate of Correction issued Jul. 19, 1994.

(51) Int. Cl.
H02M 1/12 (2006.01)

(52) U.S. Cl. .............................. 363/41; 363/98; 363/132; 323/207

(58) Field of Classification Search .................. None
See application file for complete search history.

(56) References Cited

U.S. PATENT DOCUMENTS

| | | |
|---|---|---|
| 3,946,242 A | 3/1976 | Wilkerson |
| 4,361,791 A | 11/1982 | Plunkett |
| 4,404,472 A | 9/1983 | Steigerwald |
| 4,424,557 A | 1/1984 | Steigerwald |
| 4,604,517 A | 8/1986 | Barry |
| 4,625,272 A | 11/1986 | Okuyama et al. |
| 4,729,082 A | 3/1988 | Sato |
| 4,941,079 A | 7/1990 | Ooi |
| 4,969,028 A | 11/1990 | Baliga |
| 4,994,684 A | 2/1991 | Lauw et al. |
| 5,045,991 A | 9/1991 | Dhyanchand et al. |
| 5,083,039 A | 1/1992 | Richardson et al. |

OTHER PUBLICATIONS

Investigation of Induction Motor Performance under High Negative Slip Condition for Braking Swamy et al. IEEE Xplore 2000.*
http://en.wikipedia.org/wiki/Regenerative brake 7 pages downloaded Apr. 12, 2010.*
http://en.wikipedia.org/wiki/Power factor9 pages downloaded Apr. 16, 2010.*
http://www.thefreedictionary.com/p/arbitrarily 1 page downloaded Apr. 13, 2010.*

(Continued)

Primary Examiner — Margaret Rubin

(57) ABSTRACT

A controller for controlling currents in an AC line connected to the controller is capable of causing the controlled current to assume any pre-determined magnitude and wave form. The pre-determined AC magnitude and wave form need not be of the same frequency or wave form existing at AC power lines connected to the controller. The controller uses the voltage at the AC power lines and an additional DC voltage as two sources of power to control the current in an inductor connected in series with the AC lines. A plurality of electronic switches are arranged so that at any instant in time, closing of appropriate switches will apply either the line voltage, or the sum of the line voltage and the DC voltage, or the difference between the line voltage and the DC voltage to the inductor. This causes the current of the inductor to increase or decrease at a rate determined by the net applied voltage. Because of the two sources of power, either a positive or negative voltage is available at any time for connection to the inductor. Modulation of the switches provides a time varying average voltage across the inductor that results in the desired time varying inductor current which, due to its series connection is also the AC line current. Applications of the controller include control of power factor, at unity or any desired lagging or leading level, neutralizing of harmonic line currents, and recovery of power generating externally of the controller by feeding regenerative current back to the AC power lines.

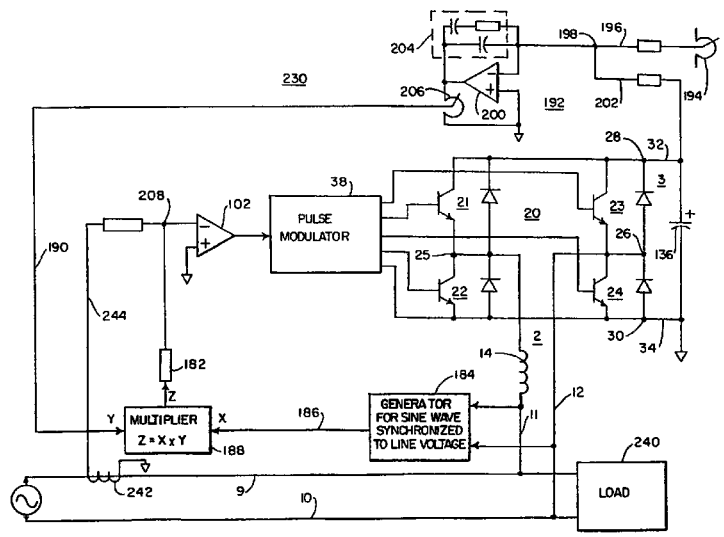

OTHER PUBLICATIONS

R.L. Steigerwald, A. Ferraro, and R.E. Tompkins, DOE/ET/29310–1 "Final Report Investigation of a Family of Power Conditioners Integrated Into the Utility Grid" (Jul. 1981).

B. J. Baliga et al., "The Insulated Gate Rectifier," IEEE Int'l Electron Devices Meeting, Abstract 10.6, pp. 264–267 (1982).

B. J. Baliga, "Fast–Switching Insulated Gate Transistors," EDL–4 IEEE Electron Dev. Letters 452 (Dec. 1983).

N. Mohan, T.M. Underland, and W.P. Robbins, "Power Electronics: Converters, Applications, and Design" (John Wiley & Sons 1989).

D. Arsudis, "Double–Fed Three–Phase Generator with Voltage Link Converter in the Rotor Circuit for Wind Power System" (Dissertation of Jan. 12, 1989, translation provided).

D. Arsudis, "Sensor–Less Power Control of a Double–Fed AC–Machine with Nearly Sinusoidal Line Currents" (EPE Aachen 1989).

W. Vollstedt, "Variable–Speed Wind Turbine Generator with Low Line Interactions" (21 th Meeting of Experts, Oct. 7–8, 1991).

H. Kohlmeier et al. "Highly Dynamic Four–Quadrant AC Motor Drive . . . ," IEEE Transactions on Industry Applications (Vol. 1A–23, No. 6, Nov./Dec. 1987).

T. Kadokura, "Inverted–Controlled Super–High–Speed Gearless Elevators," Toshiba Review (vol. 42, No. 2, 1987; translation provided).

Boon Teck OO1, Juan W. Dixon, Ashok S. Kulkarni, and Masahiro Nishimoto; "An Integrated AC Drive System Using a Controlled–Current PWM Rectifier/Inverter Link", IEEE Transactions On Power Electronics, vol. 3, No. 1, Jan. 1988.

Loren Walker; "10–MW GTO Converter for Battery Peaking Service", IEEE Transactions on Industry Applications, vol. 26, No. 1, Jan./Feb. 1990.

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-50 are cancelled.

* * * * *